United States Patent
Kuang et al.

(10) Patent No.: US 10,200,829 B2
(45) Date of Patent: Feb. 5, 2019

(54) DATA PUSHING METHOD AND RELATED APPARATUS

(71) Applicant: Huawei Technologies Co., Ltd., Shenzhen (CN)

(72) Inventors: Yunsheng Kuang, Shenzhen (CN); Yu Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 121 days.

(21) Appl. No.: 15/507,687

(22) PCT Filed: Aug. 28, 2014

(86) PCT No.: PCT/CN2014/085430
§ 371 (c)(1),
(2) Date: Feb. 28, 2017

(87) PCT Pub. No.: WO2016/029407
PCT Pub. Date: Mar. 3, 2016

(65) Prior Publication Data
US 2017/0289774 A1    Oct. 5, 2017

(51) Int. Cl.
*H04W 4/06*    (2009.01)
*H04L 29/08*   (2006.01)
(Continued)

(52) U.S. Cl.
CPC .............. *H04W 4/06* (2013.01); *H04L 67/26* (2013.01); *H04W 4/021* (2013.01); *H04W 16/14* (2013.01);
(Continued)

(58) Field of Classification Search
CPC ....... H04W 4/06; H04W 4/021; H04W 16/14; H04W 64/00; H04W 68/005; H04W 88/08; H04L 67/26; H04L 67/02
See application file for complete search history.

(56) References Cited

U.S. PATENT DOCUMENTS

2006/0025157 A1* 2/2006 Kuwahara ............... H04W 4/06
                                              455/456.1
2007/0021121 A1* 1/2007 Lane ..................... G01S 5/0009
                                              455/441
(Continued)

FOREIGN PATENT DOCUMENTS

| CN | 101822079 A | 9/2010 |
|----|-------------|--------|
| CN | 102387215 A | 3/2012 |

(Continued)

*Primary Examiner* — Habte Mered
(74) *Attorney, Agent, or Firm* — Leydig, Voit & Mayer, Ltd.

(57) ABSTRACT

A data pushing method and a related apparatus are provided. The data pushing method includes: obtaining, by a terminal, a target identifier of a target positioning base station; obtaining, by the terminal, a broadcast data stream delivered by an access device, where the broadcast data stream includes information data corresponding to identifiers of multiple positioning base stations; and extracting, by the terminal from the broadcast data stream, target information data corresponding to the target identifier. According to the present disclosure, spectrum resources are reduced, and server load is lightened.

20 Claims, 12 Drawing Sheets

(51) Int. Cl.
   *H04W 16/14*    (2009.01)
   *H04W 64/00*    (2009.01)
   *H04W 68/00*    (2009.01)
   *H04W 4/021*    (2018.01)
   *H04W 88/08*    (2009.01)

(52) U.S. Cl.
   CPC ......... *H04W 64/00* (2013.01); *H04W 68/005* (2013.01); *H04L 67/02* (2013.01); *H04W 88/08* (2013.01)

(56) References Cited

U.S. PATENT DOCUMENTS

| | | | |
|---|---|---|---|
| 2007/0021122 A1* | 1/2007 | Lane | H04B 7/01 455/441 |
| 2009/0094111 A1 | 4/2009 | Wu et al. | |
| 2011/0014929 A1* | 1/2011 | Moshfeghi | H04W 4/02 455/456.3 |
| 2011/0153430 A1* | 6/2011 | Kim | G06Q 30/0267 705/14.64 |
| 2012/0015666 A1* | 1/2012 | Horn | H04L 45/021 455/456.1 |
| 2012/0236776 A1* | 9/2012 | Zhang | H04W 48/12 370/312 |
| 2012/0260275 A1 | 10/2012 | Lee et al. | |
| 2013/0125031 A1* | 5/2013 | Calica | G06F 3/0484 715/764 |
| 2013/0308618 A1* | 11/2013 | Panneerselvam | G01S 5/0236 370/338 |
| 2015/0088656 A1* | 3/2015 | Singh | G06Q 30/0267 705/14.64 |
| 2015/0141005 A1* | 5/2015 | Suryavanshi | H04L 67/125 455/434 |

FOREIGN PATENT DOCUMENTS

| | | |
|---|---|---|
| CN | 102739852 A | 10/2012 |
| CN | 103281679 A | 9/2013 |
| CN | 103686613 A | 3/2014 |
| CN | 103826205 A | 5/2014 |
| CN | 103313269 B | 9/2015 |
| EP | 1182896 A1 | 2/2002 |
| EP | 1538859 A1 | 6/2005 |
| EP | 2093909 B1 | 12/2014 |
| KR | 20120102256 A | 9/2012 |

\* cited by examiner

DATA PUSHING METHOD AND RELATED APPARATUS

CROSS-REFERENCE TO RELATED APPLICATIONS

This application is a national stage of International Application No. PCT/CN2014/085430, filed on Aug. 28, 2014, which is hereby incorporated by reference in its entirety.

TECHNICAL FIELD

The present disclosure relates to the field of network technologies, and in particular, to a data pushing method and a related apparatus.

BACKGROUND

With development of network technologies, in some public places, a server generally needs to use an access device to push some public information data to a terminal. Optionally, information data pushed to the terminal needs to be dedicatedly pushed based on a specific location area in which the terminal is located and according to the location area in which the terminal is located. Generally, when the terminal is located in a same location area, same information data is pushed. For example, in a location based service (LBS) distribution scenario of an indoor place such as a shopping mall or a supermarket, the terminal moves as a location of a user changes, and product information data corresponding to the specific location area in which the terminal is located needs to be pushed to the terminal. For example, when the user is located in a product display area, information data corresponding to the product display area is pushed to the user.

Generally, when information data corresponding to the specific location area in which the terminal is located is pushed, positioning base stations need to be deployed in different product display areas in the shopping mall. One positioning base station is responsible for location positioning of one product display area, and the positioning base station is mainly configured to assist the server in determining the location area in which the terminal is located. The positioning base station periodically broadcasts an indication message, and the indication message includes an identifier of the positioning base station and an access address of the server. When receiving the indication message of the positioning base station, the terminal accesses the server according to the access address of the server, and reports the identifier of the positioning base station to the server. The server obtains a location area corresponding to the identifier of the positioning base station, and delivers information data corresponding to the location area to the terminal. In this manner, each terminal is an independent entity. In a process of obtaining the information data, the terminal needs to occupy particular bandwidth to maintain a connection to the server. When a quantity of terminals is relatively large, plenty of spectrum resources are consumed. In addition, the server needs to consume particular compute power to process a request of each terminal, resulting in heavy server load.

SUMMARY

Embodiments of the present disclosure provide a data pushing method and a related apparatus, thereby reducing spectrum resources, and lightening server load.

A first aspect of the present disclosure provides a data pushing method, which may include:

obtaining, by a terminal, a target identifier of a target positioning base station;

obtaining, by the terminal, a broadcast data stream delivered by an access device, where the broadcast data stream includes information data corresponding to identifiers of multiple positioning base stations; and extracting, by the terminal from the broadcast data stream, target information data corresponding to the target identifier.

Based on the first aspect, in a first feasible implementation manner, the obtaining, by a terminal, a target identifier of a target positioning base station includes:

determining, by the terminal, the target positioning base station;

obtaining, by the terminal, an indication message broadcasted by the target positioning base station, where the indication message includes the target identifier; and obtaining, by the terminal, the target identifier from the indication message by means of parsing.

Based on the first feasible implementation manner of the first aspect, in a second feasible implementation manner, the indication message further includes a broadcast channel identifier for sending the broadcast data stream by the access device; and the obtaining, by the terminal, a broadcast data stream delivered by an access device includes:

listening to, by the terminal, a frequency band corresponding to the broadcast channel identifier, and receiving the broadcast data stream broadcasted by the access device.

Based on the first feasible implementation manner of the first aspect, in a third feasible implementation manner, the indication message further includes a broadcast address and a port that are of the access device; and the obtaining, by the terminal, a broadcast data stream delivered by an access device includes:

listening to, by the terminal according to the broadcast address and the port, the broadcast data stream broadcasted by the access device.

Based on the first aspect, or the first feasible implementation manner of the first aspect, or the second feasible implementation manner of the first aspect, or the third feasible implementation manner of the first aspect, in a fourth feasible implementation manner, the target information data includes first target information data and at least one piece of second target information data, and the first target information data includes at least one label; and after the extracting, by the terminal from the broadcast data stream, target information data corresponding to the target identifier, the method further includes:

generating, by the terminal, a first service page according to the first target information data, where the first service page includes the at least one label;

displaying, by the terminal, the first service page;

when detecting that an operation is performed on a target label in a label displayed on the first service page, obtaining, by the terminal, second target information data corresponding to the target label; and generating, by the terminal, a second service page according to the second target information data corresponding to the target label, and displaying the second service page.

Based on the first aspect, or the first feasible implementation manner of the first aspect, or the second feasible implementation manner of the first aspect, or the third feasible implementation manner of the first aspect, in a fifth feasible implementation manner, the obtaining, by the terminal, a broadcast data stream delivered by an access device includes:

obtaining, by the terminal in a first preset period, the broadcast data stream delivered by the access device, where the broadcast data stream is delivered by the access device in a second preset period, and the first preset period is a positive integer multiple of the second preset period.

A second aspect of the present disclosure provides a data pushing method, which may include:

obtaining, by an access device, information data corresponding to identifiers of multiple positioning base stations; and generating, by the access device, a broadcast data stream according to the information data, and delivering the broadcast data stream, so that a terminal extracts, from the broadcast data stream, target information data corresponding to a target identifier of a target positioning base station.

Based on the second aspect, in a first feasible implementation manner, the obtaining, by an access device, information data corresponding to an identifier of each positioning base station in at least one positioning base station includes:

obtaining, by the access device, an information data stream from a location server, where the information data stream includes the information data corresponding to the identifiers of the multiple positioning base stations.

Based on the first feasible implementation manner of the second aspect, in a second feasible implementation manner, the generating, by the access device, a broadcast data stream according to the information data, and delivering the broadcast data stream includes:

determining, by the access device, the information data stream as the broadcast data stream, delivering the broadcast data stream on a preset broadcast channel, and notifying the target positioning base station of an identifier of the preset broadcast channel; or determining, by the access device, the information data stream as the broadcast data stream, delivering the broadcast data stream in a preset broadcast address and a preset port, and notifying the target positioning base station of the preset broadcast address and the preset port.

Based on the second aspect, in a third feasible implementation manner, the obtaining, by an access device, information data corresponding to an identifier of each positioning base station in at least one positioning base station includes:

obtaining, by the access device from a location server, the information data corresponding to the identifiers of the multiple positioning base stations; and the generating, by the access device, a broadcast data stream according to the information data, and delivering the broadcast data stream includes:

converting, by the access device according to a preset order, the information data corresponding to the identifiers of the multiple positioning base stations into the broadcast data stream, delivering the broadcast data stream on a preset broadcast channel, and notifying the target positioning base station of an identifier of the preset broadcast channel; or converting, by the access device according to a preset order, the information data corresponding to the identifier of each positioning base station in the at least one positioning base station into the broadcast data stream, delivering the broadcast data stream in a preset broadcast address and a preset port, and notifying the target positioning base station of the preset broadcast address and the preset port.

A third aspect of the present disclosure provides a terminal, including:

a first obtaining module, configured to obtain a target identifier of a target positioning base station;

a second obtaining module, configured to obtain a broadcast data stream delivered by an access device, where the broadcast data stream includes information data corresponding to identifiers of multiple positioning base stations; and an extraction module, configured to extract, from the broadcast data stream, target information data corresponding to the target identifier.

Based on the third aspect, in a first feasible implementation manner, the first obtaining module includes:

a determining unit, configured to determine the target positioning base station;

an obtaining unit, configured to obtain an indication message broadcasted by the target positioning base station, where the indication message includes the target identifier of the target positioning base station; and a parsing unit, configured to obtain the target identifier from the indication message by means of parsing.

Based on the first feasible implementation manner of the third aspect, in a second feasible implementation manner, the indication message further includes a broadcast channel identifier for sending the broadcast data stream by the access device; and the second obtaining module is specifically configured to: listen to a frequency band corresponding to the broadcast channel identifier, and obtain the broadcast data stream broadcasted by the access device.

Based on the first feasible implementation manner of the third aspect, in a third feasible implementation manner, the indication message further includes a broadcast address and a port that are of the access device; and the second obtaining module is specifically configured to listen to, according to the broadcast address and the port, the broadcast data stream broadcasted by the access device.

Based on the third aspect, or the first feasible implementation manner of the third aspect, or the second feasible implementation manner of the third aspect, or the third feasible implementation manner of the third aspect, in a fourth feasible implementation manner, the target information data includes first target information data and at least one piece of second target information data, and the first target information data includes at least one label; and the terminal further includes:

a generation module, configured to generate a first service page according to the first target information data, where the first service page includes the at least one label;

a display module, configured to display the first service page;

a third obtaining module, configured to: when detecting that an operation is performed on a target label in a label displayed on the first service page, obtain second target information data corresponding to the target label; and a generation and display module, configured to: generate a second service page according to the second target information data corresponding to the target label, and display the second service page.

Based on the third aspect, or the first feasible implementation manner of the third aspect, or the second feasible implementation manner of the third aspect, or the third feasible implementation manner of the third aspect, in a fifth feasible implementation manner, the second obtaining module is specifically configured to obtain, in a first preset period, the broadcast data stream delivered by the access device, where the broadcast data stream is delivered by the access device in a second preset period, and the first preset period is a positive integer multiple of the second preset period.

A fourth aspect of the present disclosure provides an access device, and the access device includes:

a fourth obtaining module, configured to obtain information data corresponding to identifiers of multiple positioning base stations; and a generation and sending module, configured to: generate a broadcast data stream according to the information data, and deliver the broadcast data stream, so that a terminal extracts, from the broadcast data stream, target information data corresponding to a target identifier of a target positioning base station.

Based on the fourth aspect, in a first feasible implementation manner, the fourth obtaining module is specifically configured to obtain an information data stream from a location server, where the information data stream includes the information data corresponding to the identifiers of the multiple positioning base stations.

Based on the first feasible implementation manner of the fourth aspect, in a second feasible implementation manner, the generation and sending module is specifically configured to: determine the information data stream as the broadcast data stream, deliver the broadcast data stream on a preset broadcast channel, and notify the target positioning base station of an identifier of the preset broadcast channel; or the generation and sending module is specifically configured to: determine the information data stream as the broadcast data stream, deliver the broadcast data stream in a preset broadcast address and a preset port, and notify the target positioning base station of the preset broadcast address and the preset port.

Based on the fourth aspect, in a third feasible implementation manner, the fourth obtaining module is specifically configured to obtain, from a location server, the information data corresponding to the identifiers of the multiple positioning base stations; and the generation and sending module is specifically configured to: convert, according to a preset order, the information data corresponding to the identifiers of the multiple positioning base stations into the broadcast data stream, deliver the broadcast data stream on a preset broadcast channel, and notify the target positioning base station of an identifier of the preset broadcast channel; or the generation and sending module is specifically configured to: convert, according to a preset order, the information data corresponding to the identifiers of the multiple positioning base stations into the broadcast data stream, deliver the broadcast data stream in a preset broadcast address and a preset port, and notify the target positioning base station of the preset broadcast address and the preset port.

A fifth aspect of the present disclosure provides a terminal, and the terminal includes a receiver and a processor, where the receiver is configured to obtain a target identifier of a target positioning base station;

the receiver is further configured to obtain a broadcast data stream delivered by an access device, where the broadcast data stream includes information data corresponding to identifiers of multiple positioning base stations; and the processor is configured to extract, from the broadcast data stream, target information data corresponding to the target identifier.

Based on the fifth aspect, in a first feasible implementation manner, the receiver is further configured to determine the target positioning base station;

the receiver is further configured to obtain an indication message broadcasted by the target positioning base station, where the indication message includes the target identifier of the target positioning base station; and the processor is further configured to obtain the target identifier from the indication message by means of parsing.

Based on the first feasible implementation manner of the fifth aspect, in a second feasible implementation manner, the indication message further includes a broadcast channel identifier for sending the broadcast data stream by the access device; and the receiver is further configured to: listen to a frequency band corresponding to the broadcast channel identifier, and obtain the broadcast data stream broadcasted by the access device.

Based on the first feasible implementation manner of the fifth aspect, in a third feasible implementation manner, the indication message further includes a broadcast address and a port that are of the access device; and the receiver is further configured to listen to, according to the broadcast address and the port, the broadcast data stream broadcasted by the access device.

Based on the fifth aspect, or the first feasible implementation manner of the fifth aspect, or the second feasible implementation manner of the fifth aspect, or the third feasible implementation manner of the fifth aspect, in a fourth feasible implementation manner, the terminal further includes a display;

the target information data includes first target information data and at least one piece of second target information data, and the first target information data includes at least one label;

the processor is further configured to generate a first service page according to the first target information data, where the first service page includes the at least one label;

the display is configured to display the first service page;

the processor is further configured to: when detecting that an operation is performed on a target label in a label displayed on the first service page, obtain second target information data corresponding to the target label; and the display is further configured to: generate a second service page according to the second target information data corresponding to the target label, and display the second service page.

Based on the fifth aspect, or the first feasible implementation manner of the fifth aspect, or the second feasible implementation manner of the fifth aspect, or the third feasible implementation manner of the fifth aspect, in a fifth feasible implementation manner, the receiver is further configured to obtain, in a first preset period, the broadcast data stream delivered by the access device, where the broadcast data stream is delivered by the access device in a second preset period, and the first preset period is a positive integer multiple of the second preset period.

A sixth aspect of the present disclosure provides an access device, and the access device includes a receiver, a processor, and a transmitter, where the receiver is configured to obtain information data corresponding to identifiers of multiple positioning base stations;

the processor is configured to generate a broadcast data stream according to the information data; and the transmitter is configured to deliver the broadcast data stream, so that a terminal extracts, from the broadcast data stream, target information data corresponding to a target identifier of a target positioning base station.

Based on the sixth aspect, in a first feasible implementation manner, the receiver is further configured to obtain an information data stream from a location server, where the information data stream includes the information data corresponding to the identifiers of the multiple positioning base stations.

Based on the first feasible implementation manner of the sixth aspect, in a second feasible implementation manner, the transmitter is further configured to: determine the information data stream as the broadcast data stream, deliver the broadcast data stream on a preset broadcast channel, and notify the target positioning base station of an identifier of the preset broadcast channel; or the transmitter is further configured to: determine the information data stream as the broadcast data stream, deliver the broadcast data stream in a preset broadcast address and a preset port, and notify the target positioning base station of the preset broadcast address and the preset port.

Based on the sixth aspect, in a third feasible implementation manner, the receiver is further configured to obtain, from a location server, the information data corresponding to the identifiers of the multiple positioning base stations; and the processor is further configured to convert, according to a preset order, the information data corresponding to the identifiers of the multiple positioning base stations into the broadcast data stream, and the transmitter is configured to: deliver the broadcast data stream on a preset broadcast channel, and notify the target positioning base station of an identifier of the preset broadcast channel; or the processor is further configured to convert, according to a preset order, the information data corresponding to the identifiers of the multiple positioning base stations into the broadcast data stream, and the transmitter is configured to: deliver the broadcast data stream in a preset broadcast address and a preset port, and notify the target positioning base station of the preset broadcast address and the preset port.

In the embodiments of the present disclosure, a terminal obtains a target identifier of a target positioning base station and a broadcast data stream that is delivered by an access device and that includes information data corresponding to an identifier of each positioning base station, and extracts, from the broadcast data stream, target information data corresponding to the target identifier. In this implementation manner, the terminal only needs to extract the corresponding target information data from the obtained broadcast data stream without a need to independently request a server, thereby reducing spectrum resources. In addition, the server does not need to independently process a request of each terminal, thereby lightening server load.

BRIEF DESCRIPTION OF DRAWINGS

To describe the technical solutions in the embodiments of the present disclosure or in the prior art more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
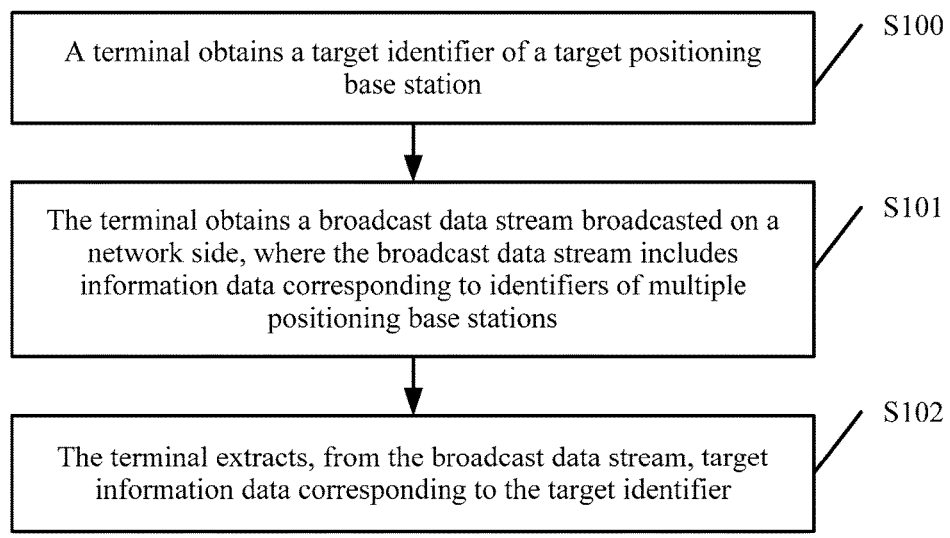
FIG. 1 is a schematic flowchart of a data pushing method according to the present disclosure.

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

A specific application scenario to which the present disclosure can be applied may be a public indoor place in which an indoor positioning base station is deployed and a corresponding indoor positioning service is provided, such as a large shopping mall, a supermarket, an airport, a railway station, or a theater. A large shopping mall is used as an example. Generally, there are many different stores in a large shopping mall, and several wireless positioning base stations are configured in each store in the shopping mall, to determine a specific location of a terminal by means of labeling. Each positioning base station periodically broadcasts a beacon frame, and the beacon frame carries an identifier ID of the positioning base station, a broadcast channel identifier of a wireless access point (AP), and a uniform resource locator (URL) of a location based service (LBS) server. One or more APs may be configured in each store in the shopping mall, and the AP has a service set identifier (SSID) and is used by a terminal for accessing the Internet to establish a connection to the LBS server. Certainly, there may be no AP configured in a store. A terminal device of a user accesses the Internet in a mobile communication access manner, such as 3G/4G/LTE, that is, the terminal device accesses the Internet by using a mobile base station to interact with the LBS server. Each positioning base station has a unique identifier. An optional deployment location is determined by a merchant. Generally, each positioning base station is responsible for an LBS service in a display area of each type of specific product in the store. For example, there are five positioning base stations, which are respectively corresponding to terminal positioning in display areas of products such as an iPhone, an iPad, an iPod, and the like.

LBS data distributed by the LBS server may be generally classified into public LBS information data and private LBS information data. The public LBS information data is LBS information data pushed by a merchant to all customers, and different users obtain same public LBS information data. The private LBS information data is personalized LBS information data customized by a merchant for different customers, and generally, a user needs to perform registration and authentication to obtain the private LBS information data. The present disclosure is mainly applied to a case in which a user obtains public LBS information data. Generally, users located in a location area determined by a positioning base station obtain same public LBS information data.

The following describes some nouns mentioned in the embodiments of the present disclosure.

Terminal: A terminal in the embodiments of the present disclosure may be a mobile terminal. The terminal is installed with an application program of an indoor positioning service to receive a beacon frame broadcasted by a positioning base station. Optionally, the terminal may be a smartphone, a tablet computer, a palmtop computer, a personal digital assistant, or the like.

Positioning base station: A positioning base station is a wireless signal transmitter placed in a specific indoor location. The positioning base station is placed in a fixed location. Once the positioning base station is deployed in an indoor environment, the positioning base station periodically broadcasts a beacon frame in a wireless signal form, such as Wi-Fi or Bluetooth BLE. Because of a requirement for power consumption, most positioning base stations broadcast beacon frames in a Bluetooth BLE manner. According to Bluetooth BLE specifications, frequency bands (2402 MHz, 2426 MHz, and 2480 MHz) of three broadcast channels are defined. In this case, the positioning base station periodically broadcasts a beacon frame on the foregoing three broadcast channels in turn. Generally, an effective coverage area of a broadcasted beacon frame signal is 15-50 meters, and a specific coverage area depends on transmit power of the positioning base station. The broadcasted beacon frame carries an identifier (ID) corresponding to the positioning base station. In addition, the beacon frame further carries other information. For example, information carried in the beacon frame is extended in the present disclosure, and the beacon frame includes a broadcast channel identifier of a wireless access point AP, a uniform resource locator (URL) of an LBS server, and the like.

Access device: An access device is configured to provide a terminal with a function of accessing the Internet. Different access devices are used in different network access manners. For example, if the Internet is accessed in a wireless local area network (WLAN) manner such as Wi-Fi, the access device is a Wi-Fi access point AP; and if the Internet is accessed by using mobile cellular such as 3G/4G/LTE, an AP may be understood as a base station deployed by a mobile network operator. The access device provides the terminal with a data connection, and allocates an IP address, so that the terminal can access the Internet.

Target positioning base station: a target positioning base station determined by a terminal. When the terminal is located in a coverage area of a positioning base station, the positioning base station is determined as the target positioning base station. When the terminal is located in an overlapping area covered by multiple positioning base stations, a positioning base station closest to the terminal is determined as the target positioning base station.

Broadcast data stream: A broadcast data stream is data obtained after streaming processing. Data in the broadcast data stream exists as a coded signal sequence, and has a pre-stipulated order. In the embodiments of the present disclosure, information data corresponding to identifiers of multiple positioning base stations exists in the broadcast data stream as a particular sequence, and information data corresponding to an identifier of a same positioning base station exists in the broadcast data stream as a continuous sequence. There is a particular time interval between information data corresponding to identifiers of different positioning base stations.

Target information data: information data that is in a broadcast data stream and is corresponding to a target identifier of a target positioning base station. The target information data includes first target information data and at least one piece of second target information data. The first target information data includes at least one label, and the label is corresponding to second target information data. For example, the target information data is all HTML document data related to iPhone series products in a shopping mall.

First target information data: The first target information data is information data that is in target information data and that provides a general overview of each piece of second target information data, and includes at least one label. For example, the target information data is all HTML document data related to iPhone series products in a shopping mall. The first target information data may be HTML document data related to a welcome interface, and includes three labels: iPhone 5s, iPhone 5c, and iPhone 4s.

First service page: The first service page is a Web page generated by using first target information data, and includes at least one label, such as an iPhone welcome page; and includes three labels: iPhone 5s, iPhone 5c, and iPhone 4s.

Second target information data: data corresponding to a label. For example, three labels including iPhone 5s, iPhone 5c, and iPhone 4s each are corresponding to corresponding second target information data. The second target information data is data for describing these three types of products in detail: an iPhone 5s, an iPhone 5c, and an iPhone 4s.

Second service page: a Web page generated by using second target information data. The second target information data is obtained when a user performs an operation on a target label in a label displayed on a first service page and is corresponding to the target label. For example, if the target label is iPhone 5c, the second service page is a Web page for specifically describing an iPhone 5c. With reference to FIG. 1 to FIG. 9, the following describes in detail data pushing methods provided in the embodiments of the present disclosure.

Referring to FIG. 1, FIG. 1 is a schematic flowchart of a data pushing method according to an embodiment of the present disclosure. The method may include the following step S100 to step S102.

S100. A terminal obtains a target identifier of a target positioning base station.

In a specific embodiment, the terminal obtains the target identifier of the target positioning base station, and the target identifier may represent a location area of the target positioning base station.

Optionally, when the terminal is located in a place in which a positioning base station is deployed, the terminal performs listening on a broadcast channel, to receive one or more beacon frame signals periodically broadcasted by one or more positioning base stations in this place. Because effective coverage areas of all positioning base stations in a store overlap, the terminal may receive a beacon frame signal broadcasted by one positioning base station, or may receive beacon frame signals broadcasted by multiple positioning base stations. When receiving the beacon frame signals broadcasted by the multiple positioning base stations, the terminal needs to calculate receive power of each beacon frame signal, and determine a beacon frame signal with strongest receive power. In this case, it means that a user is closest to a corresponding positioning base station, and the positioning base station closest to the user is set as the target positioning base station.

Generally, a beacon frame signal broadcasted by a positioning base station includes an identifier of the positioning base station. Therefore, the terminal may obtain, from a beacon frame signal broadcasted by the target positioning base station, the target identifier of the target positioning base station by means of parsing.

S101. The terminal obtains a broadcast data stream delivered by an access device, where the broadcast data stream includes information data corresponding to identifiers of multiple positioning base stations.

In a specific embodiment, each positioning base station in the multiple positioning base stations has an identifier. The broadcast data stream includes information data corresponding to the identifier of each positioning base station in the multiple positioning base stations.

Optionally, a relationship between a positioning base station and an access device is that information data corresponding to an identifier of the positioning base station is delivered to the terminal by the access device. The information data corresponding to the identifiers of the multiple positioning base stations may be delivered by one or more access devices, and a quantity of access devices is not limited. When the information data corresponding to the identifiers of the multiple positioning base stations is delivered by multiple access devices, each access device delivers a same broadcast data stream, and the broadcast data stream includes the information data corresponding to the identifiers of the multiple positioning base stations. When a required broadcast scope is relatively wide, the multiple access devices may be deployed.

The terminal obtains the broadcast data stream from the access device. The broadcast data stream includes the information data corresponding to the identifier of each positioning base station in the multiple positioning base stations. The information data corresponding to the identifier of the positioning base station is pre-stored public information data in a location area determined by the positioning base station. For example, if the location area determined by the positioning base station is an iPad product display area, the information data corresponding to the identifier of the positioning base station may be public information data related to iPad introduction.

Optionally, the terminal does not directly receive the broadcast data stream from a server. Instead, the server delivers original information data to an AP; the AP re-encapsulates the obtained information data, generates the broadcast data stream, and broadcasts the broadcast data stream on a frequency band corresponding to a broadcast channel identifier of the AP; and the terminal listens to, on the frequency band corresponding to the broadcast channel identifier of the AP, the broadcast data stream broadcasted by the AP. In addition, alternatively, the server may perform streaming processing on information data to form an information data stream, where the information data stream includes the information data corresponding to the identifier of each positioning base station; and then send the information data stream to a mobile base station. The mobile base station determines the information data stream as the broadcast data stream, and delivers the broadcast data stream according to a preset broadcast address and a preset port. The terminal listens to the broadcast data stream according to the corresponding broadcast address and the corresponding port.

S102. The terminal extracts, from the broadcast data stream, a target information data stream corresponding to the target identifier.

In a specific embodiment, the broadcast data stream includes information data corresponding to identifiers of all positioning base stations. Therefore, the terminal may extract, from the broadcast data stream, target information data corresponding to the target identifier. The target information data is public information data corresponding to a location area determined by the target positioning base station.

Optionally, when receiving the broadcast data stream, the terminal sequentially detects the information data in the received broadcast data stream, and detects whether the identifier of each positioning base station in the broadcast data stream is consistent with the target identifier. If the identifier of each positioning base station is consistent with the target identifier, the terminal extracts the target information data corresponding to the target identifier; or if the identifier of each positioning base station is not consistent with the target identifier, the terminal discards the received information data.

In this embodiment of the present disclosure, a terminal obtains a target identifier of a target positioning base station and a broadcast data stream that is delivered by an access device and that includes information data corresponding to an identifier of each positioning base station, and extracts, from the broadcast data stream, target information data corresponding to the target identifier. In this implementation manner, the terminal only needs to extract the corresponding target information data from the obtained broadcast data stream without a need to independently request a server, thereby reducing spectrum resources. In addition, the server does not need to independently process a request of each terminal, thereby lightening server load.

Figure 2:
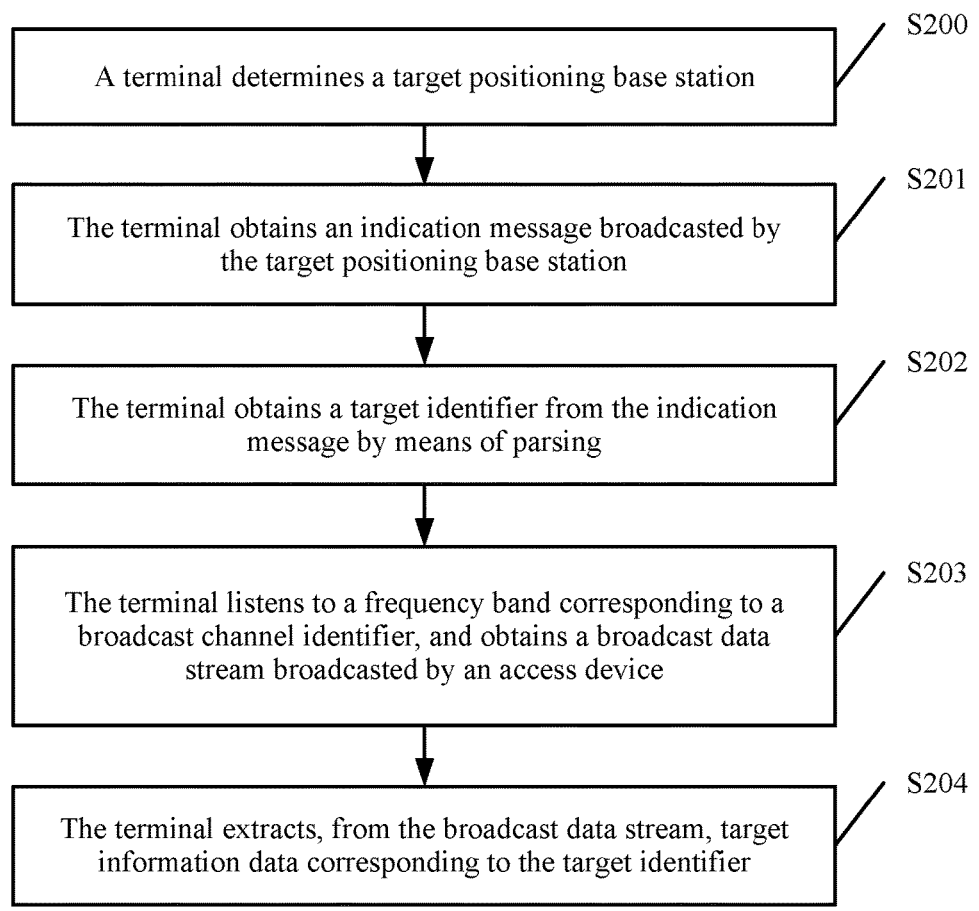
FIG. 2 is a schematic flowchart of another data pushing method according to the present disclosure.

Referring to FIG. 2, FIG. 2 is a schematic flowchart of another data pushing method according to an embodiment of the present disclosure. An indication message broadcasted by a target positioning base station includes a broadcast channel identifier for sending a broadcast data stream by an access device. The method may include the following step S200 to S203.

S200. The terminal determines the target positioning base station.

In a specific embodiment, when the terminal is located in a place in which a positioning base station is deployed, the terminal receives an indication message broadcasted by the positioning base station. When the terminal is located in an effective coverage area of a positioning base station, the terminal receives an indication message broadcasted by the positioning base station, and determines the positioning base station as the target positioning base station. Because effective coverage areas of all positioning base stations may overlap, when the terminal is located in an overlapping area of effective coverage areas of multiple positioning base stations, the terminal receives at least one indication message. In this case, the terminal compares receive power of all indication messages, and determines a positioning base station corresponding to an indication message with strongest receive power as the target positioning base station, that is, the terminal determines a positioning base station closest to the terminal as the target positioning base station.

S201. The terminal obtains an indication message broadcasted by the target positioning base station, where the indication message includes the target identifier of the target positioning base station.

In a specific embodiment, a method for obtaining the target identifier of the target positioning base station by the terminal may be: the terminal obtains the indication message broadcasted by the target positioning base station, where the indication message includes the target identifier of the target positioning base station.

Herein, an example in which the indication message is a beacon frame is used for description. The positioning base station is a wireless signal transmitter placed in a specific indoor location. The positioning base station periodically broadcasts a beacon frame in a wireless signal form such as Wi-Fi or Bluetooth. After determining the target positioning base station, the terminal obtains a beacon frame broadcasted by the target positioning base station.

S202. The terminal obtains the target identifier from the indication message by means of parsing.

In a specific embodiment, the terminal obtains the target identifier from the received indication message by means of parsing. Optionally, the terminal may obtain, from a beacon frame by means of parsing, a target identifier carried in the beacon frame.

S203. The terminal listens to a frequency band corresponding to the broadcast channel identifier, and receives the broadcast data stream broadcasted by the access device.

In a specific embodiment, the access device may be an AP, and herein, the access device is used as an example for description. The indication message may further include a broadcast channel identifier for delivering the broadcast data stream by the AP. The terminal obtains the broadcast channel identifier from the indication message, and listens to a frequency band corresponding to the broadcast channel identifier. The AP delivers the broadcast data stream on a broadcast channel represented by the broadcast channel identifier. Therefore, the terminal may obtain the broadcast data stream broadcasted by the AP. The broadcast data stream includes information data corresponding to an identifier of each positioning base station.

S204. The terminal extracts, from the broadcast data stream, target information data corresponding to the target identifier.

For step S204 in this embodiment of the present disclosure, refer to step S102 shown in FIG. 1. Details are not described herein repeatedly.

In this embodiment of the present disclosure, a terminal obtains a target identifier of a target positioning base station and a broadcast data stream that is delivered by an access device and that includes information data corresponding to an identifier of each positioning base station, and extracts, from the broadcast data stream, target information data corresponding to the target identifier. In this implementation manner, the terminal only needs to extract the corresponding target information data from the obtained broadcast data stream without a need to independently request a server, thereby reducing spectrum resources. In addition, the server does not need to independently process a request of each terminal, thereby lightening server load.

Figure 3:
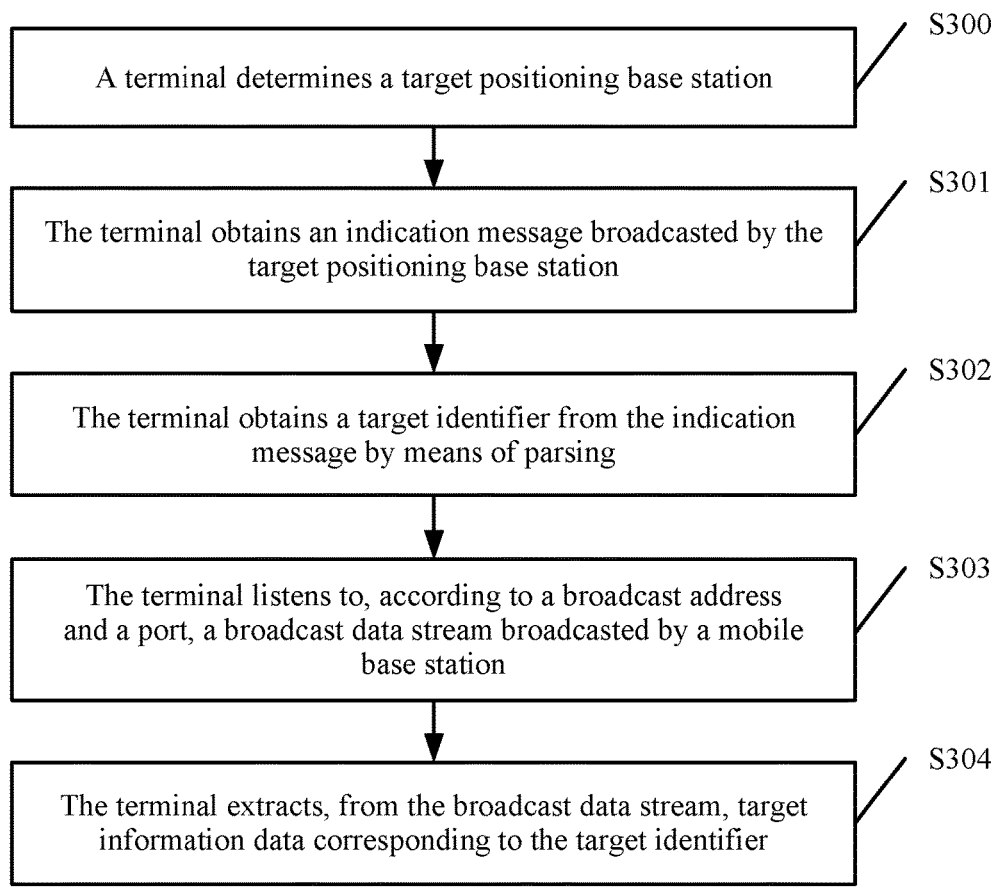
FIG. 3 is a schematic flowchart of still another data pushing method according to the present disclosure.

Referring to FIG. 3, FIG. 3 is a schematic flowchart of still another data pushing method according to an embodiment of the present disclosure. An indication message broadcasted by a target positioning base station includes a broadcast address and a port that are of an access device. The method may include the following step S300 to S303.

S300. The terminal determines the target positioning base station.

S301. The terminal obtains an indication message broadcasted by the target positioning base station, where the indication message includes the target identifier of the target positioning base station.

For step S301 in this embodiment of the present disclosure, refer to step S200 shown in FIG. 2. Details are not described herein repeatedly.

S302. The terminal obtains the target identifier from the indication message by means of parsing.

For step S302 in this embodiment of the present disclosure, refer to step S201 shown in FIG. 2. Details are not described herein repeatedly.

S303. The terminal listens to, according to the broadcast address and a port, the broadcast data stream broadcasted by the access device.

In a specific embodiment, the access device may be a mobile base station, and herein, the mobile base station is used as an example for description. The broadcast data stream is broadcasted by the mobile base station. Therefore, the indication message broadcasted by the target positioning base station includes a broadcast address and a port for delivering the broadcast data stream by the mobile base station. The terminal obtains, by means of parsing, the broadcast address and the port from the indication message broadcasted by the target positioning base station, and listens to, according to the broadcast address and the port, the broadcast data stream broadcasted by the mobile base station. It should be noted that the indication message may be a beacon frame, and content in the beacon frame may be extended.

The terminal obtains the broadcast data stream by using the mobile base station, that is, the terminal is connected to the mobile base station by turning on a cellular mobile wireless communication system such as 3G/4G/LTE, so as to access the Internet.

S304. The terminal extracts, from the broadcast data stream, target information data corresponding to the target identifier.

For step S304 in this embodiment of the present disclosure, refer to step S102 shown in FIG. 1. Details are not described herein repeatedly.

In this embodiment of the present disclosure, a terminal obtains a target identifier of a target positioning base station and a broadcast data stream that is delivered by an access device and that includes information data corresponding to an identifier of each positioning base station, and extracts, from the broadcast data stream, target information data corresponding to the target identifier. In this implementation manner, the terminal only needs to extract the corresponding target information data from the obtained broadcast data stream without a need to independently request a server, thereby reducing spectrum resources. In addition, the server does not need to independently process a request of each terminal, thereby lightening server load.

Figure 4:
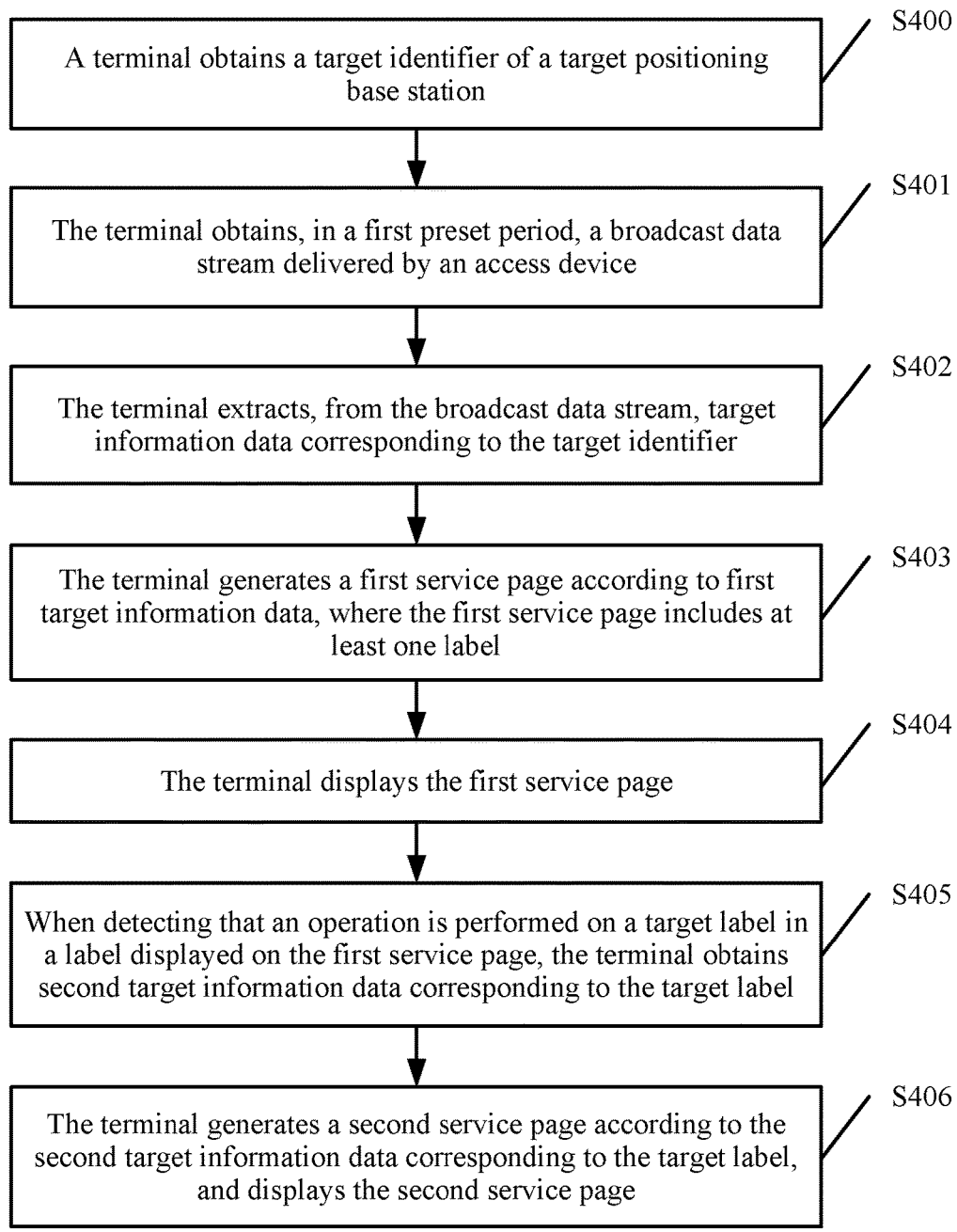
FIG. 4 is a schematic flowchart of still another data pushing method according to the present disclosure.

Referring to FIG. 4, FIG. 4 is a schematic flowchart of still another data pushing method according to an embodiment of the present disclosure. The method may include the following step S400 to step S406.

S400. A terminal obtains a target identifier of a target positioning base station.

For step S400 in this embodiment of the present disclosure, refer to step S100 shown in FIG. 1. Details are not described herein repeatedly.

S401. The terminal obtains, in a first preset period, the broadcast data stream delivered by the access device, where the broadcast data stream is delivered by the access device in a second preset period, and the first preset period is a positive integer multiple of the second preset period.

In a specific embodiment, the access device generally broadcasts the broadcast data stream in a particular period. For example, the access device delivers the broadcast data stream in the second preset period, and the second preset period may be 1 s, that is, the delivered broadcast data stream is repeatedly delivered every 1 s. Within the 1 s, the broadcast data stream includes information data corresponding to all positioning base stations in the at least one positioning base station. Because the information data may be updated at any time, broadcast data streams delivered in every period may be different. To obtain updated content in a timely manner by the terminal, the terminal obtains, in the first preset period, the broadcast data stream delivered by the access device, and the first preset period is an integer multiple of the second preset period. For example, the first preset period may be 3 s. The terminal automatically discards same information data received in the first preset period. The updated content may be obtained in a timely manner when the terminal obtains the broadcast data stream in the first preset period.

S402. The terminal extracts, from the broadcast data stream, target information data corresponding to the target identifier.

For step S402 in this embodiment of the present disclosure, refer to step S102 shown in FIG. 1. Details are not described herein repeatedly.

S403. The terminal generates a first service page according to the first target information data, where the first service page includes the at least one label.

In a specific embodiment, the target information data includes the first target information data and at least one piece of second target information data, and the first target information data includes the at least one label. The at least one piece of second target information data may be in a one-to-one correspondence with the at least one label, or one label may be corresponding to multiple pieces of second target information data. The correspondence may be an association relationship between second target information data and a label. For example, the label may be a link of the second target information data, and the second target information data corresponding to the label may be obtained by using the label.

The terminal generates the first service page according to the first target information data in the target information data, where the first service page includes the at least one label. Herein, an example in which the first service page is an LBS service page is used for description. The LBS service page is a document edited by using a Hypertext Markup Language (HTML). The document includes several labels, and may be opened in a browser and another application program and displayed as a Web page. Generally, one positioning base station is corresponding to one LBS service page. Therefore, the first service page is a service page corresponding to the target positioning base station. For example, if a location area determined by the target positioning base station is an iPhone product display area, the first service page is iPhone series product introduction, and the first service page includes three labels: iPhone 5s, iPhone 5c, and iPhone 4s.

S404. The terminal displays the first service page.

In a specific embodiment, the terminal may display the first service page, and enable a user to perform an operation on the service page. For example, if the first service page is a Hypertext Markup Language document, the terminal may open the first service page in a browser and another application program, and display the first service page as a Web page.

S405. When detecting that an operation is performed on a target label in a label displayed on the first service page, the terminal obtains second target information data corresponding to the target label.

In a specific embodiment, the user may perform an operation on the label displayed on the first service page. When detecting that an operation is performed on the target label in the displayed label, the terminal obtains the second target information data corresponding to the target label.

Optionally, herein, a label in an LBS service page is used as an example for description. When the terminal displays the first service page, the user may obtain, by clicking an icon or another object on the page, an LBS service page corresponding to the target label. For example, when the terminal of the user displays the first service page of the iPhone series product introduction, the three labels including the iPhone 5s, the iPhone 5c, and the iPhone 4s are displayed on this page. When the user wants to read specific product introduction of the iPhone 5s, the user may click a label of the iPhone 5s on the terminal. In this case, the iPhone 5s is the target label. The terminal obtains, from the target information data, second target information data corresponding to the iPhone 5s, and the second target information data corresponding to the iPhone 5s is HTML document data for describing the iPhone 5s in detail.

S406. The terminal generates a second service page according to the second target information data corresponding to the target label, and displays the second service page.

In a specific embodiment, the terminal generates the second service page according to the second target information data corresponding to the target label, and displays the second service page.

Optionally, the terminal finds, according to the target label, second target information data that is corresponding to the target label and is related to iPhone 5s product performance introduction, that is, the HTML document data for describing the iPhone 5s in detail; generates an LBS service page, and displays the LBS service page on the terminal.

In this embodiment of the present disclosure, a terminal obtains a target identifier of a target positioning base station and a broadcast data stream that is delivered by an access device and that includes information data corresponding to an identifier of each positioning base station, and extracts, from the broadcast data stream, target information data corresponding to the target identifier. In this implementation manner, the terminal only needs to extract the corresponding target information data from the obtained broadcast data stream without a need to independently request a server, thereby reducing spectrum resources. In addition, the server does not need to independently process a request of each terminal, thereby lightening server load.

Figure 5:
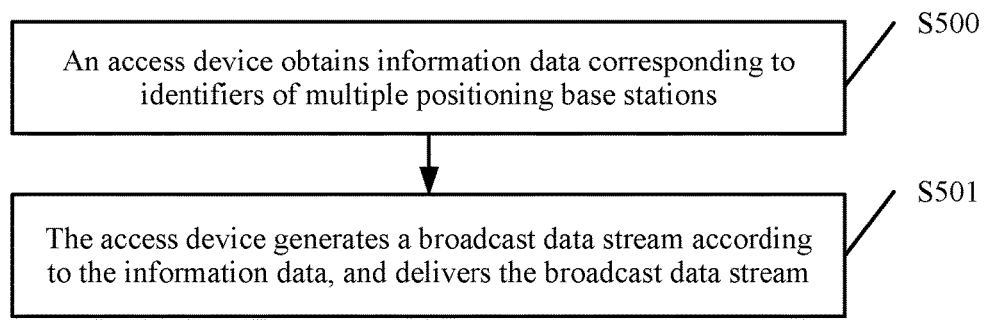
FIG. 5 is a schematic flowchart of still another data pushing method according to the present disclosure.

Referring to FIG. 5, FIG. 5 is a schematic flowchart of a data pushing method according to an embodiment of the present disclosure. The method may include the following step S500 to step S501.

S500. An access device obtains information data corresponding to identifiers of multiple positioning base stations.

In an embodiment, each positioning base station in the multiple positioning base stations has an identifier. The access device obtains information data corresponding to the identifier of each positioning base station in the multiple positioning base stations. A relationship between an access device and a positioning base station is that the information data corresponding to the identifiers of the multiple positioning base stations is delivered by the access device.

Before delivering a broadcast data stream to a terminal, the access device needs to convert original information data into the broadcast data stream. Therefore, the access device obtains the information data corresponding to the identifiers of the multiple positioning base stations. A manner in which the access device obtains the information data is not limited. Herein, two obtaining manners are used as an example for description.

In a first manner, a manner in which the access device obtains the information data corresponding to the identifier of each positioning base station may be: a server performs streaming processing on the information data corresponding to the identifier of each positioning base station, to form an information data stream. The access device obtains the information data stream from a location server, where the information data stream includes the information data corresponding to the identifier of each positioning base station.

In a second manner, a manner in which the access device obtains the information data corresponding to the identifier of each positioning base station may be: the access device directly obtains, from a server, the information data, corresponding to the identifier of each positioning base station, on which streaming processing is not performed.

The information data may be static HTML document data. The information data corresponding to the identifier of each positioning base station may be preset public information data in a location area determined by each positioning base station, that is, the terminal obtains same information data when the terminal is located in a location area determined by a same positioning base station.

S501. The access device generates a broadcast data stream according to the information data, and delivers the broadcast data stream, so that a terminal extracts, from the broadcast data stream, target information data corresponding to a target identifier of a target positioning base station.

In an embodiment, the access device generates the broadcast data stream according to the obtained information data corresponding to the identifier of each positioning base station, and delivers the broadcast data stream. The terminal may extract, from the broadcast data stream, the target information data corresponding to the target identifier of the target positioning base station. It should be noted that a delivering area in which the access device delivers the broadcast data stream is a coverage area of the access device. For example, if the access device is in a store, the delivering area in which the access device delivers the broadcast data stream may be an entire store.

A manner in which the access device generates the broadcast data stream according to the information data specifically needs to be determined according to a manner in which the access device obtains the information data. For example, if the information data received by the access device exists as an information data stream, the access device directly determines the information data stream as the broadcast data stream, and delivers the broadcast data stream. If the information data received by the access device exists as information data, that is, streaming processing is not performed on the information data, the access device needs to convert the information data to generate the broadcast data stream.

In this embodiment of the present disclosure, a terminal obtains a target identifier of a target positioning base station and a broadcast data stream that is delivered by an access device and that includes information data corresponding to an identifier of each positioning base station, and extracts, from the broadcast data stream, target information data corresponding to the target identifier. In this implementation manner, the terminal only needs to extract the corresponding target information data from the obtained broadcast data stream without a need to independently request a server, thereby reducing spectrum resources. In addition, the server does not need to independently process a request of each terminal, thereby lightening server load.

Figure 6:
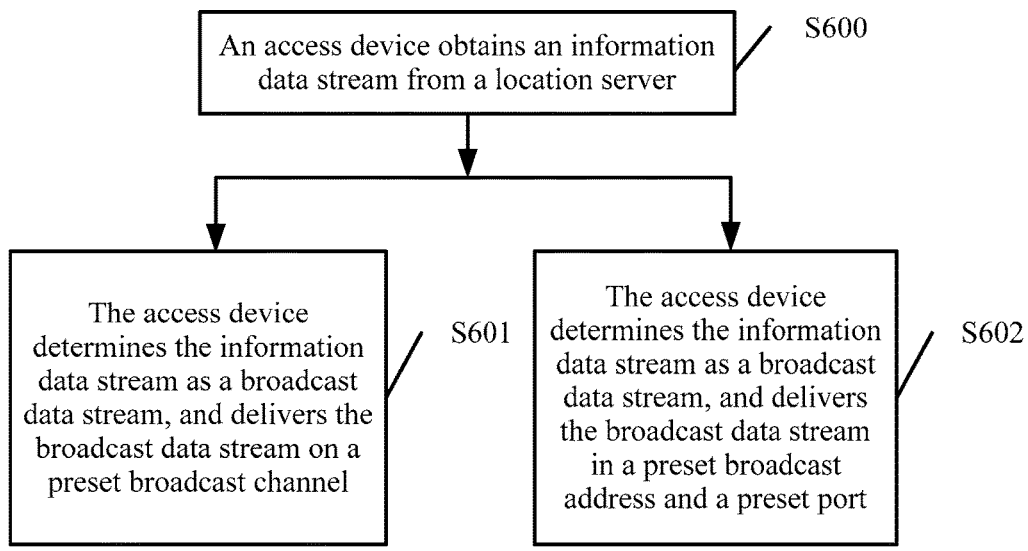
FIG. 6 is a schematic flowchart of still another data pushing method according to the present disclosure.

Referring to FIG. 6, FIG. 6 is a schematic flowchart of still another data pushing method according to an embodiment of the present disclosure. The method may include the following steps.

S600. The access device obtains an information data stream from a location server, where the information data stream includes information data corresponding to identifiers of the multiple positioning base stations.

In an embodiment, the access device may be a mobile base station or an AP, and a specific existence form of the access device is not limited. The location server performs streaming processing on information data corresponding to an identifier of each positioning base station, to form an information data stream. The access device obtains the information data stream from the location server, where the information data stream includes the information data corresponding to the identifier of each positioning base station.

After obtaining the information data stream from the location server, the access device generates a broadcast data stream according to the obtained information data stream, and delivers the broadcast data stream. A manner in which the access device delivers the broadcast data stream may include the following two implementation manners: a first implementation manner S601 and a second implementation manner S602. It should be noted that the access device may deliver the broadcast data stream in another manner, and the two manners herein are merely used as an example.

S601. The access device determines the information data stream as the broadcast data stream, delivers the broadcast data stream on a preset broadcast channel, and notifies the target positioning base station of an identifier of the preset broadcast channel.

In an optional implementation manner, the information data stream is information data obtained after streaming processing. Therefore, the access device may determine the information data stream as the broadcast data stream, deliver the broadcast data stream on the preset broadcast channel, and simultaneously notify all positioning base stations of the identifier of the preset broadcast channel. All the positioning base stations include the target positioning base station. When periodically broadcasting an indication message, the target positioning base station may encapsulate, into the indication message, the broadcast channel identifier of the preset broadcast channel on which the access device delivers the broadcast data stream. When receiving the indication message, the terminal may obtain the broadcast channel identifier from the indication message by means of parsing, and listen to the broadcast data stream on a frequency band corresponding to the broadcast channel identifier.

S602. The access device determines the information data stream as the broadcast data stream, delivers the broadcast data stream in a preset broadcast address and a preset port, and notifies the target positioning base station of the preset broadcast address and the preset port.

In an optional implementation manner, the information data stream is information data obtained after streaming processing. Therefore, the access device may determine the information data stream as the broadcast data stream, deliver the broadcast data stream in the preset broadcast address and the preset port, and simultaneously notify all positioning base stations of the broadcast address and the port. All the positioning base stations include the target positioning base station. When periodically broadcasting an indication message, the target positioning base station may encapsulate, into the indication message, the broadcast address and the port for delivering the broadcast data stream by the access device. When receiving the indication message, the terminal may obtain the broadcast address and the port from the indication message by means of parsing, and listen to the broadcast data stream according to the broadcast address and the port.

In this embodiment of the present disclosure, a terminal obtains a target identifier of a target positioning base station and a broadcast data stream that is delivered by an access device and that includes information data corresponding to an identifier of each positioning base station, and extracts, from the broadcast data stream, target information data corresponding to the target identifier. In this implementation manner, the terminal only needs to extract the corresponding target information data from the obtained broadcast data stream without a need to independently request a server, thereby reducing spectrum resources. In addition, the server does not need to independently process a request of each terminal, thereby lightening server load.

Figure 7:
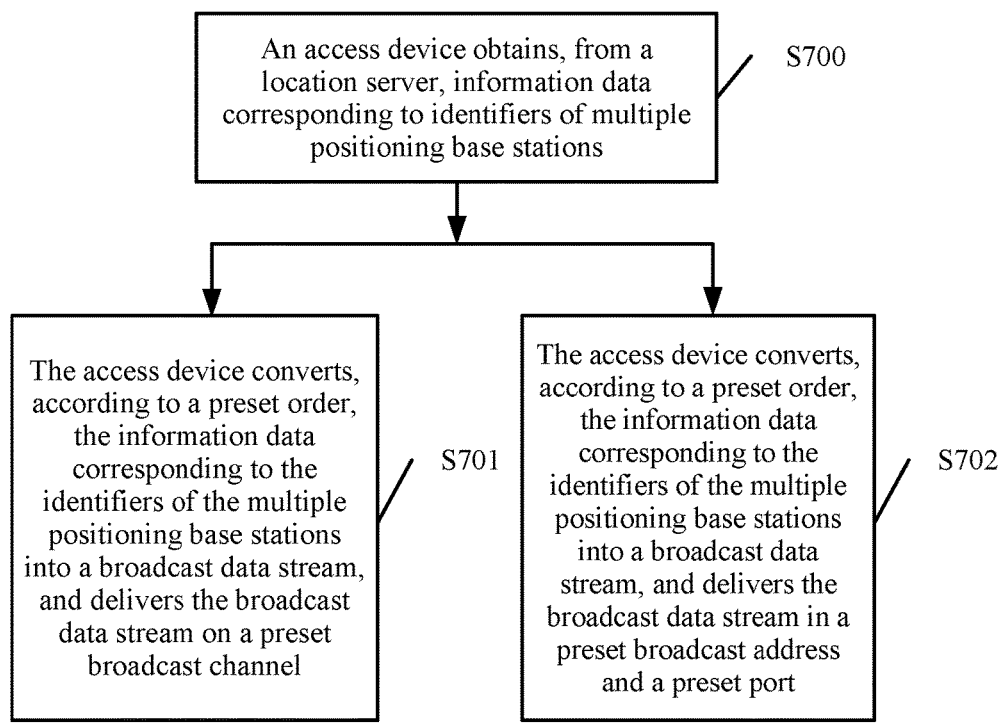
FIG. 7 is a schematic flowchart of still another data pushing method according to the present disclosure.

Referring to FIG. 7, FIG. 7 is a schematic flowchart of still another data pushing method according to an embodiment of the present disclosure. The method may include the following steps.

S700. The access device obtains, from a location server, information data corresponding to identifiers of the multiple positioning base stations.

In an embodiment, the access device may be a mobile base station or an AP, and a specific existence form of the access device is not limited. The location server serves as a source of providing the information data corresponding to the identifier of each positioning base station in at least one positioning base station. The access device may obtain, from the location server, the information data corresponding to the identifiers of the multiple positioning base stations. The information data that is corresponding to the identifier of each positioning base station in the multiple positioning base stations and is obtained by the access device from the server is static HTML document data.

Because streaming processing is not performed on the obtained information data, the access device needs to perform streaming processing on the information data to form a broadcast data stream, and deliver the formed broadcast data stream. An optional delivering manner may include the following two implementation manners: a first implementation manner S701 and a second implementation manner S702. It should be noted that the access device may deliver the broadcast data stream in another manner, and the two manners herein are merely used as an example.

S701. The access device converts, according to a preset order, the information data corresponding to the identifiers of the multiple positioning base stations into a broadcast data stream, delivers the broadcast data stream on a preset broadcast channel, and notifies the target positioning base station of an identifier of the preset broadcast channel.

In an optional implementation manner, the access device converts, according to the preset order, the obtained information data corresponding to the identifier of each positioning base station in the multiple positioning base stations into the broadcast data stream, and delivers the broadcast data stream on the preset broadcast channel. Optionally, a manner of forming the broadcast data stream may be sorting identifiers of all positioning base stations according to the preset order. For example, the sorted identifiers of all the positioning base stations are a, b, c, and d, and information data corresponding to the sorted identifiers of all the positioning base stations is sequentially delivered according to a particular time interval, to form the broadcast data stream.

The access device delivers the broadcast data stream on the preset broadcast channel, and simultaneously notifies all the positioning base stations of the identifier of the preset broadcast channel. All the positioning base stations include the target positioning base station. When periodically broadcasting an indication message, the target positioning base station may encapsulate, into the indication message, the broadcast channel identifier of the preset broadcast channel on which the access device delivers the broadcast data stream. When receiving the indication message, the terminal may obtain the broadcast channel identifier from the indication message by means of parsing, and listen to the broadcast data stream on a frequency band corresponding to the broadcast channel identifier.

S702. The access device converts, according to a preset order, information data corresponding to an identifier of each positioning base station in the at least one positioning base station into a broadcast data stream, delivers the broadcast data stream in a preset broadcast address and a preset port, and notifies the target positioning base station of the preset broadcast address and the preset port.

In an optional implementation manner, the access device converts, according to the preset order, the obtained information data corresponding to the identifier of each positioning base station in the at least one positioning base station into the broadcast data stream, and delivers the broadcast data stream in the preset broadcast address and the preset port. Optionally, a manner of forming the broadcast data stream may be sorting identifiers of all positioning base stations according to the preset order. For example, the sorted identifiers of all the positioning base stations are a, b, c, and d, and information data corresponding to the sorted identifiers of all the positioning base stations is sequentially delivered according to a particular time interval, to form the broadcast data stream.

The access device delivers the broadcast data stream in the preset broadcast address and the preset port, and simultaneously notifies all the positioning base stations of the broadcast address and the port. All the positioning base stations include the target positioning base station. When periodically broadcasting an indication message, the target positioning base station may encapsulate, into the indication message, the broadcast address and the port for delivering the broadcast data stream by the access device. When receiving the indication message, the terminal may obtain the broadcast address and the port from the indication message by means of parsing, and listen to the broadcast data stream according to the broadcast address and the port.

In this embodiment of the present disclosure, a terminal obtains a target identifier of a target positioning base station and a broadcast data stream that is delivered by an access device and that includes information data corresponding to an identifier of each positioning base station, and extracts, from the broadcast data stream, target information data corresponding to the target identifier. In this implementation manner, the terminal only needs to extract the corresponding target information data from the obtained broadcast data stream without a need to independently request a server, thereby reducing spectrum resources. In addition, the server does not need to independently process a request of each terminal, thereby lightening server load.

Figure 8:
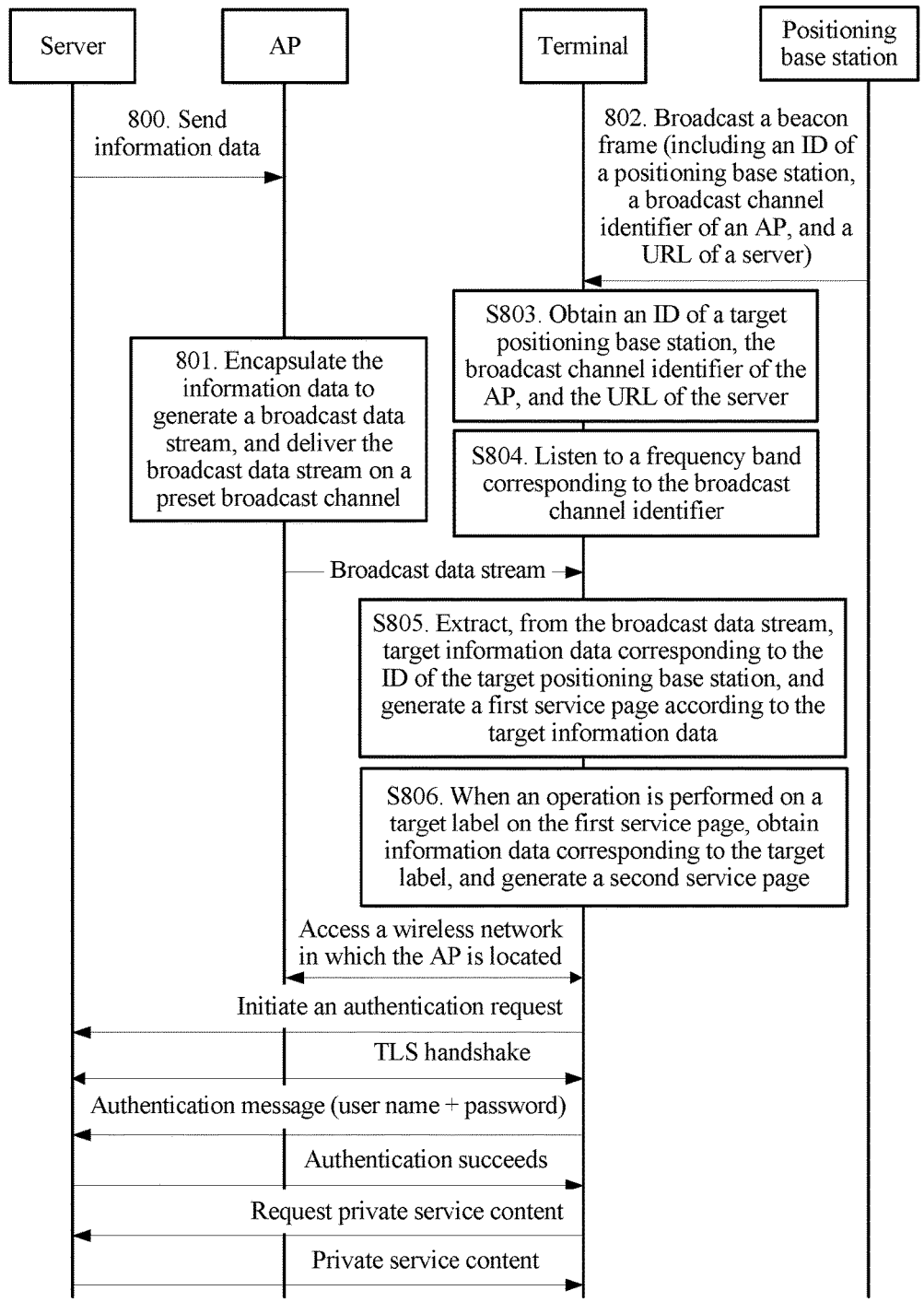
FIG. 8 is a schematic diagram of information interaction in a practical application scenario according to the present disclosure.

Referring to FIG. 8, FIG. 8 is a schematic diagram of information interaction in a practical application scenario according to an embodiment of the present disclosure. As shown in the figure, the schematic diagram is described in detail in this embodiment.

S800. A server sends information data to an AP.

S801. The AP encapsulates the information data to generate a broadcast data stream, and delivers the broadcast data stream on a preset broadcast channel.

S802. A positioning base station broadcasts a beacon frame, where the beacon frame includes an ID of a target positioning base station, a broadcast channel identifier of the AP, and a URL of the server.

S803. A terminal obtains the ID of the target positioning base station, the broadcast channel identifier of the AP, and the URL of the server.

S804. The terminal listens to a frequency band corresponding to the broadcast channel identifier, and obtains the broadcast data stream delivered by the AP.

S805. The terminal extracts, from the broadcast data stream, target information data corresponding to the ID of the target positioning base station, and generates a first service page according to first target information data in the target information data.

S806. When an operation is performed on a target label on the first service page, obtain second target information data corresponding to the target label, and generate a second service page.

Further, to obtain private information data from the server, the terminal initiates an authentication request to the server according to the URL of the server. Transport Layer Security (TLS) protocol handshake is performed between the server and the terminal. The terminal sends an authentication message to the server for authentication, and the authentication message includes a user name and a password. The server attempts to authenticate the authentication message. After the authentication succeeds, the terminal requests the private information data from the server, and the server delivers the private information data to the terminal.

In this embodiment of the present disclosure, a terminal obtains a target identifier of a target positioning base station and a broadcast data stream that is delivered by an access device and that includes information data corresponding to an identifier of each positioning base station, and extracts, from the broadcast data stream, target information data corresponding to the target identifier. In this implementation manner, the terminal only needs to extract the corresponding target information data from the obtained broadcast data stream without a need to independently request a server, thereby reducing spectrum resources. In addition, the server does not need to independently process a request of each terminal, thereby lightening server load.

Figure 9:
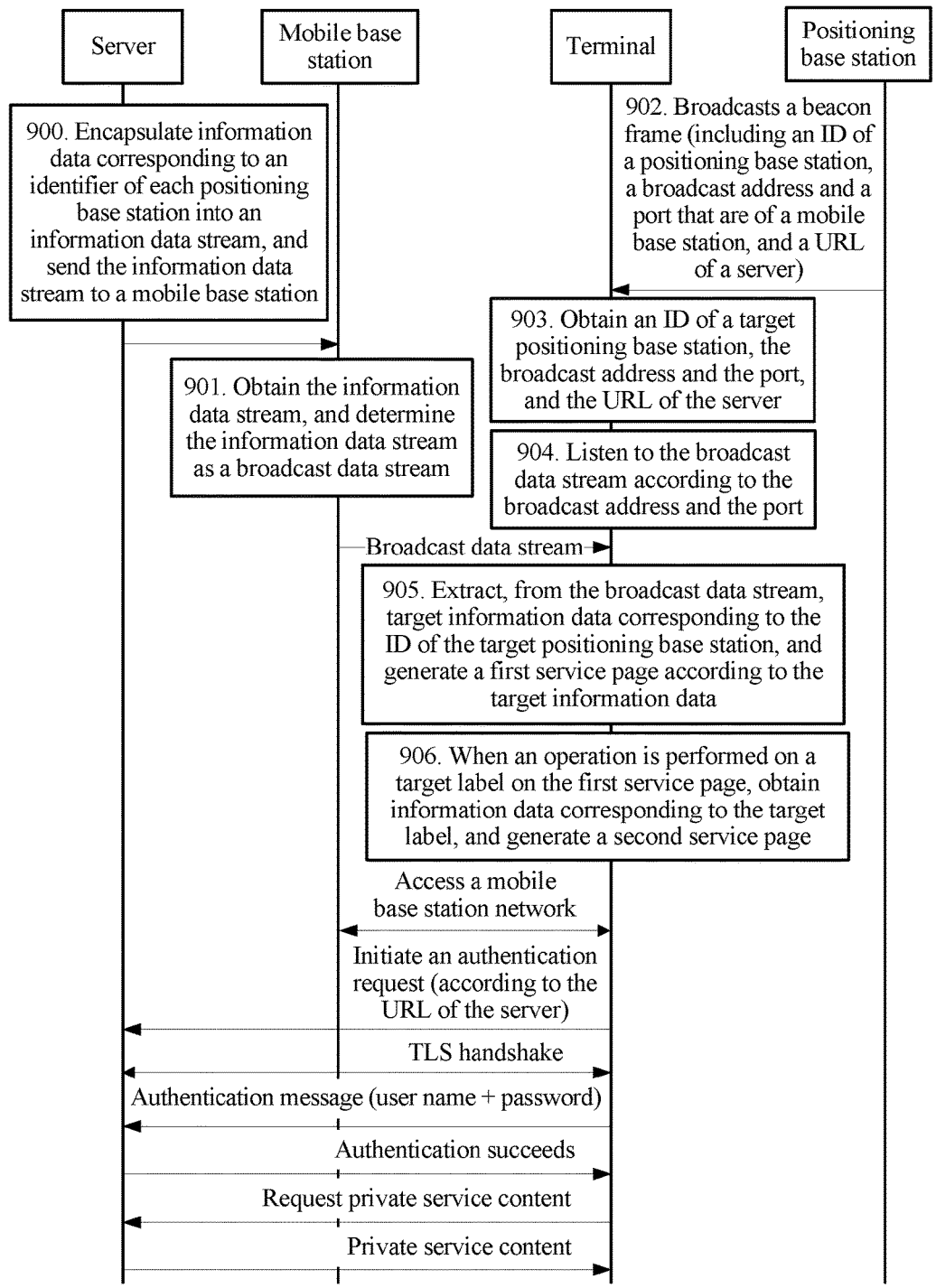
FIG. 9 is a schematic diagram of information interaction in another practical application scenario according to the present disclosure.

Referring to FIG. 9, FIG. 9 is a schematic diagram of information interaction in another practical application scenario according to an embodiment of the present disclosure. As shown in the figure, the schematic diagram is described in detail in this embodiment.

900. A server encapsulates information data corresponding to an identifier of each positioning base station into an information data stream, and sends the information data stream to a mobile base station.

S901. The mobile base station obtains the information data stream from the server, determines the information data stream as a broadcast data stream, and broadcasts the broadcast data stream according to a preset broadcast address and a preset port.

S902. A positioning base station broadcasts a beacon frame, where the beacon frame includes an ID of the positioning base station, a broadcast address and a port that are of the mobile base station, and a URL of the server.

S903. A terminal obtains an ID of a target positioning base station, the broadcast address and the port that are of the mobile base station, and the URL of the server.

S904. The terminal listens to, according to the broadcast address and the port, the broadcast data stream broadcasted by the mobile base station.

S905. The terminal extracts, from the broadcast data stream, target information data corresponding to the ID of the target positioning base station, and generates a first service page according to the target information data.

S906. When an operation is performed on a target label on the first service page, obtain second target information data corresponding to the target label, and generate a second service page according to the second target information data.

Further, to obtain private information data from the server, the terminal initiates an authentication request to the server according to the URL of the server. Transport Layer Security (TLS) protocol handshake is performed between the server and the terminal. The terminal sends an authentication message to the server for authentication, and the authentication message includes a user name and a password. The server attempts to authenticate the authentication message. After the authentication succeeds, the terminal requests the private information data from the server, and the server delivers the private information data to the terminal.

In this embodiment of the present disclosure, a terminal obtains a target identifier of a target positioning base station and a broadcast data stream that is delivered by an access device and that includes information data corresponding to an identifier of each positioning base station, and extracts, from the broadcast data stream, target information data corresponding to the target identifier. In this implementation manner, the terminal only needs to extract the corresponding target information data from the obtained broadcast data stream without a need to independently request a server, thereby reducing spectrum resources. In addition, the server does not need to independently process a request of each terminal, thereby lightening server load.

With reference to FIG. 10 to FIG. 14, the following describes in detail related data pushing apparatuses provided in embodiments of the present disclosure. It should be noted that the following related data pushing apparatuses can be applied to the foregoing methods.

Figure 10:
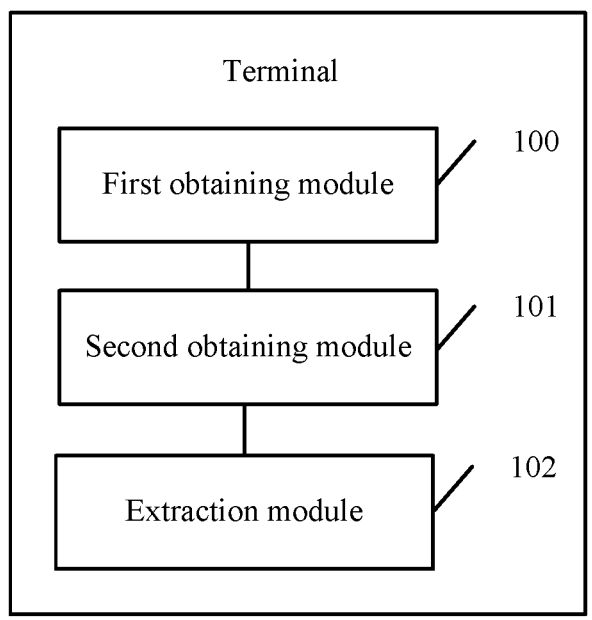
FIG. 10 is a schematic structural diagram of a terminal according to the present disclosure.

Referring to FIG. 10, FIG. 10 is a schematic structural diagram of a terminal according to an embodiment of the present disclosure. The terminal may include a first obtaining module 100, a second obtaining module 101, and an extraction module 102.

The first obtaining module 100 is configured to obtain a target identifier of a target positioning base station.

In a specific embodiment, the first obtaining module 100 of the terminal obtains the target identifier of the target positioning base station, and the target identifier may represent a location area of the target positioning base station.

Optionally, a manner in which the first obtaining module 100 of the terminal obtains the target identifier of the target positioning base station may be: when the terminal is located in a place in which a positioning base station is deployed, the terminal performs listening on a broadcast channel, to receive one or more beacon frame signals periodically broadcasted by one or more positioning base stations in this place. Because effective coverage areas of all positioning base stations in a store overlap, the terminal may receive a beacon frame signal broadcasted by one positioning base station, or may receive beacon frame signals broadcasted by multiple positioning base stations. When receiving the beacon frame signals broadcasted by the multiple positioning base stations, the terminal needs to calculate receive power of each beacon frame signal, and determine a beacon frame signal with strongest receive power. In this case, it means that a user is closest to a corresponding positioning base station, and the positioning base station closest to the user is set as the target positioning base station. That is, a location in which the terminal is located in this case is in a location area determined by the target positioning base station.

Generally, a beacon frame signal broadcasted by a positioning base station includes an identifier of the positioning base station. Therefore, the terminal may obtain, from a beacon frame signal broadcasted by the target positioning base station, the target identifier of the target positioning base station by means of parsing.

Optionally, the first obtaining module 100 may include a determining unit, an obtaining unit, and a parsing unit.

The determining unit is configured to determine the target positioning base station.

In a specific embodiment, when the terminal is located in a place in which a positioning base station is deployed, the terminal receives an indication message broadcasted by the positioning base station. When the terminal is located in an effective coverage area of a positioning base station, the terminal receives an indication message broadcasted by the positioning base station, and the determining unit determines the positioning base station as the target positioning base station. Because effective coverage areas of all positioning base stations may overlap, when the terminal is located in an overlapping area of effective coverage areas of multiple positioning base stations, the terminal receives at least one indication message. In this case, the determining unit of the terminal compares receive power of all indication messages, and determines a positioning base station corresponding to an indication message with strongest receive power as the target positioning base station, that is, the determining unit of the terminal determines a positioning base station closest to the terminal as the target positioning base station.

The obtaining unit is configured to obtain an indication message broadcasted by the target positioning base station, where the indication message includes the target identifier of the target positioning base station.

In a specific embodiment, a method for obtaining the target identifier of the target positioning base station by the terminal may be: the obtaining unit of the terminal obtains the indication message broadcasted by the target positioning base station determined by the determining unit, where the indication message includes the target identifier of the target positioning base station.

Herein, an example in which the indication message is a beacon frame is used for description. The positioning base station is a wireless signal transmitter placed in a specific indoor location. The positioning base station periodically broadcasts a beacon frame in a wireless signal form such as Wi-Fi or Bluetooth. Because of a requirement for power consumption, most positioning base stations broadcast beacon frames in a Bluetooth manner. According to Bluetooth specifications, frequency bands (2402 MHz, 2426 MHz, and 2480 MHz) of three broadcast channels are defined. In this case, the positioning base station periodically broadcasts a beacon frame on the foregoing three broadcast channels in turn. The broadcasted beacon frame carries an identifier (ID) of the positioning base station, and the identifier may be used to represent optional location coordinates of the positioning base station. In addition, the beacon frame further carries other information. For example, information carried in the beacon frame is extended in the present disclosure, and the beacon frame includes a broadcast channel identifier of a wireless access point AP, and the like. After determining the target positioning base station, the terminal obtains a beacon frame broadcasted by the target positioning base station.

The parsing unit is configured to obtain the target identifier from the indication message by means of parsing.

In a specific embodiment, the parsing unit of the terminal obtains the target identifier from the received indication message by means of parsing. Optionally, the parsing unit may obtain, from a beacon frame by means of parsing, a target identifier carried in the beacon frame.

The second obtaining module 101 is configured to obtain a broadcast data stream delivered by an access device, where the broadcast data stream includes information data corresponding to identifiers of multiple positioning base stations.

In a specific embodiment, each positioning base station in the multiple positioning base stations has an identifier. The broadcast data stream includes information data corresponding to the identifier of each positioning base station in the multiple positioning base stations.

Optionally, information data corresponding to an identifier of a positioning base station is delivered to the terminal by the access device. The information data corresponding to the identifiers of the multiple positioning base stations may be delivered by one or more access devices, and a quantity of access devices is not limited. When the information data corresponding to the identifiers of the multiple positioning base stations is delivered by multiple access devices, each access device delivers a same broadcast data stream, and the broadcast data stream includes the information data corresponding to the identifiers of the multiple positioning base stations. When a required broadcast scope is relatively wide, the multiple access devices may be deployed.

The second obtaining module 101 of the terminal obtains the broadcast data stream from the access device. The broadcast data stream includes the information data corresponding to the identifier of each positioning base station in the multiple positioning base stations. The information data corresponding to the identifier of the positioning base station is pre-stored public information data in a location area determined by the positioning base station. For example, if the location area determined by the positioning base station is an iPad product display area, the information data corresponding to the identifier of the positioning base station may be public information data related to iPad introduction.

Optionally, the terminal does not directly receive the broadcast data stream from a server. Instead, the server delivers original information data to an AP; the AP re-encapsulates the obtained information data, generates the broadcast data stream, and broadcasts the broadcast data stream on a frequency band corresponding to a broadcast channel identifier of the AP; and the terminal listens to, on the frequency band corresponding to the broadcast channel identifier of the AP, the broadcast data stream broadcasted by the AP. In addition, alternatively, the server may perform streaming processing on information data to form an information data stream, where the information data stream includes the information data corresponding to the identifier of each positioning base station; and then send the information data stream to a mobile base station. The mobile base station determines the information data stream as the broadcast data stream, and delivers the broadcast data stream according to a preset broadcast address and a preset port. The terminal listens to the broadcast data stream according to the corresponding broadcast address and the corresponding port.

Optionally, the indication message further includes a broadcast channel identifier for sending the broadcast data stream by the access device. The second obtaining module 101 is specifically configured to: listen to a frequency band corresponding to the broadcast channel identifier, and receive the broadcast data stream broadcasted by the access device.

In a specific embodiment, the access device may be an AP, and herein, the access device is used as an example for description. The indication message may further include a broadcast channel identifier for delivering the broadcast data stream by the AP. The second obtaining module 101 of the terminal obtains the broadcast channel identifier from the indication message, and listens to a frequency band corresponding to the broadcast channel identifier. The AP delivers the broadcast data stream on a broadcast channel represented by the broadcast channel identifier. Therefore, the terminal may obtain the broadcast data stream broadcasted by the AP. The broadcast data stream includes the information data corresponding to the identifier of each positioning base station.

Optionally, the indication message further includes a broadcast address and a port that are of the access device. The second obtaining module 101 is specifically configured to listen to, according to the broadcast address and the port, the broadcast data stream broadcasted by the access device.

In a specific embodiment, the access device may be a mobile base station, and herein, the mobile base station is used as an example for description. The broadcast data stream is broadcasted by the mobile base station. Therefore, the indication message broadcasted by the target positioning base station includes a broadcast address and a port for delivering the broadcast data stream by the mobile base station. The second obtaining module 101 of the terminal obtains, by means of parsing, the broadcast address and the port from the indication message broadcasted by the target positioning base station, and listens to, according to the broadcast address and the port, the broadcast data stream broadcasted by the mobile base station. It should be noted that the indication message may be a beacon frame, and content in the beacon frame may be extended.

The terminal obtains the broadcast data stream by using the mobile base station, that is, the terminal is connected to the mobile base station by turning on a cellular mobile wireless communication system such as 3G/4G/LTE, so as to access the Internet.

Optionally, the second obtaining module 101 is specifically configured to obtain, in a first preset period, the broadcast data stream delivered by the access device, where the broadcast data stream is delivered by the access device in a second preset period, and the first preset period is a positive integer multiple of the second preset period.

In a specific embodiment, the access device generally broadcasts the broadcast data stream in a particular period. For example, the access device delivers the broadcast data stream in the second preset period, and the second preset period may be 1 s, that is, the delivered broadcast data stream is repeatedly delivered every 1 s. Within the 1 s, the broadcast data stream includes information data corresponding to all positioning base stations in the at least one positioning base station. Because the information data may be updated at any time, broadcast data streams delivered in every period may be different. To obtain updated content in a timely manner by the terminal, the second obtaining module 101 of the terminal obtains, in the first preset period, the broadcast data stream delivered by the access device, and the first preset period is an integer multiple of the second preset period. For example, the first preset period may be 3 s. The terminal automatically discards same information data received in the first preset period. The updated content may be obtained in a timely manner when the terminal obtains the broadcast data stream in the first preset period.

The extraction module 102 is configured to extract, from the broadcast data stream, target information data corresponding to the target identifier.

In a specific embodiment, the broadcast data stream includes information data corresponding to identifiers of all positioning base stations. Therefore, the extraction module 102 of the terminal may extract, from the broadcast data stream, the target information data corresponding to the target identifier. The target information data is public information data corresponding to the location area determined by the target positioning base station.

Optionally, when receiving the broadcast data stream, the terminal sequentially detects the information data in the received broadcast data stream, and detects whether the identifier of each positioning base station in the broadcast data stream is consistent with the target identifier. If the identifier of each positioning base station is consistent with the target identifier, the terminal extracts the target information data corresponding to the target identifier; or if the identifier of each positioning base station is not consistent with the target identifier, the terminal discards the received information data.

In this embodiment of the present disclosure, a terminal obtains a target identifier of a target positioning base station and a broadcast data stream that is delivered by an access device and that includes information data corresponding to an identifier of each positioning base station, and extracts, from the broadcast data stream, target information data corresponding to the target identifier. In this implementation manner, the terminal only needs to extract the corresponding target information data from the obtained broadcast data stream without a need to independently request a server, thereby reducing spectrum resources. In addition, the server does not need to independently process a request of each terminal, thereby lightening server load.

Figure 11:
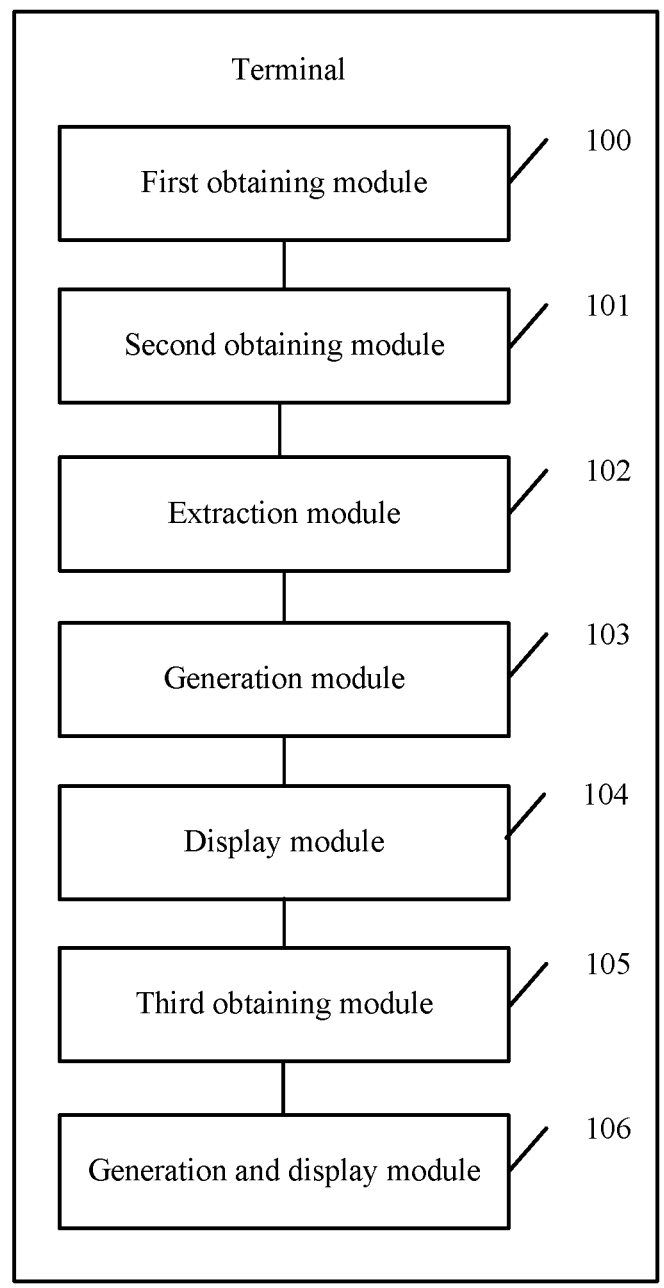
FIG. 11 is a schematic structural diagram of another terminal according to the present disclosure.

Referring to FIG. 11, FIG. 11 is a schematic structural diagram of another terminal according to an embodiment of the present disclosure. The target information data includes first target information data and at least one piece of second target information data, and the first target information data includes at least one label. The terminal may include: a first obtaining module 100, a second obtaining module 101, an extraction module 102, a generation module 103, a display module 104, a third obtaining module 105, and a generation and display module 106. For the first obtaining module 100, the second obtaining module 101, and the extraction module 102, refer to FIG. 10. Details are not described herein repeatedly.

The generation module 103 is configured to generate a first service page according to the first target information data, where the first service page includes the at least one label.

In a specific embodiment, the target information data includes the first target information data and the at least one piece of second target information data, and the first target information data includes the at least one label. The at least one piece of second target information data may be in a one-to-one correspondence with the at least one label, or one label may be corresponding to multiple pieces of second target information data. The correspondence may be an association relationship between second target information data and a label. For example, the label may be a link of the second target information data, and the second target information data corresponding to the label may be obtained by using the label.

The first generation module 103 of the terminal generates the first service page according to the first target information data in a target information data stream, where the first service page includes the at least one label. Herein, an example in which the first service page is an LBS service page is used for description. The LBS service page is a document edited by using a Hypertext Markup Language (HTML). The document includes several labels, and may be opened in a browser and another application program and displayed as a Web page. Generally, one positioning base station is corresponding to one LBS service page. Therefore, the first service page is a service page corresponding to the target positioning base station. For example, if a location area determined by the target positioning base station is an iPhone product display area, the first service page is iPhone series product introduction, and the first service page includes three labels: iPhone 5s, iPhone 5c, and iPhone 4s.

The display module 104 is configured to display the first service page.

In a specific embodiment, the display module 104 of the terminal may display the first service page, and enable a user to perform an operation on the service page. For example, if the first service page is a Hypertext Markup Language document, the terminal may open the first service page in a browser and another application program, and display the first service page as a Web page.

The third obtaining module 105 is configured to: when detecting that an operation is performed on a target label in a label displayed on the first service page, obtain second target information data corresponding to the target label.

In a specific embodiment, the user may perform an operation on the label displayed on the first service page. When detecting that an operation is performed on the target label in the displayed label, the third obtaining module 105 of the terminal obtains the second target information data corresponding to the target label.

Optionally, herein, a label in an LBS service page is used as an example for description. When the terminal displays the first service page, the user may obtain, by clicking an icon or another object on the page, an LBS service page corresponding to the target label. For example, when the terminal of the user displays the first service page of the iPhone series product introduction, the three labels including the iPhone 5s, the iPhone 5c, and the iPhone 4s are displayed on this page. When the user wants to read specific product introduction of the iPhone 5s, the user may click a label of the iPhone 5s on the terminal. In this case, the iPhone 5s is the target label. The terminal obtains, from the target information data, second target information data corresponding to the iPhone 5s, and the second target information data corresponding to the iPhone 5s is HTML document data for describing the iPhone 5s in detail.

The generation and display module 106 is configured to: generate a second service page according to the second target information data corresponding to the target label, and display the second service page.

In a specific embodiment, the generation and display module 106 of the terminal generates the second service page according to the second target information data corresponding to the target label, and displays the second service page.

Optionally, the terminal finds, according to the target label, second target information data that is corresponding to the target label and is related to iPhone 5s product performance introduction, that is, the HTML document data for describing the iPhone 5s in detail; generates an LBS service page, and displays the LBS service page on the terminal.

In this embodiment of the present disclosure, a terminal obtains a target identifier of a target positioning base station and a broadcast data stream that is delivered by an access device and that includes information data corresponding to an identifier of each positioning base station, and extracts, from the broadcast data stream, target information data corresponding to the target identifier. In this implementation manner, the terminal only needs to extract the corresponding target information data from the obtained broadcast data stream without a need to independently request a server, thereby reducing spectrum resources. In addition, the server does not need to independently process a request of each terminal, thereby lightening server load.

Figure 12:
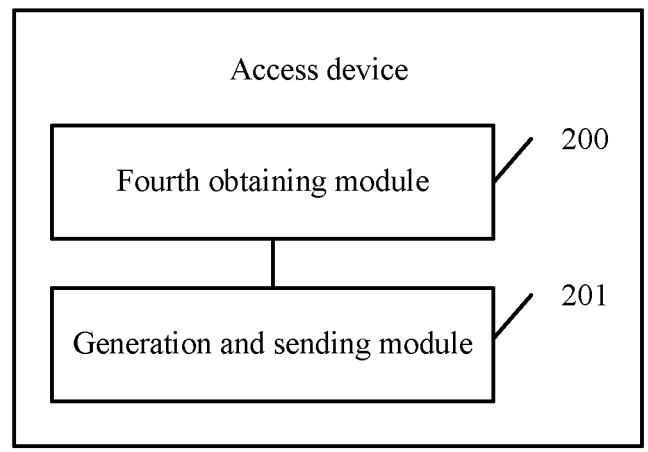
FIG. 12 is a schematic structural diagram of an access device according to the present disclosure.

Referring to FIG. 12, FIG. 12 is a schematic structural diagram of an access device according to an embodiment of the present disclosure. The access device may include a fourth obtaining module 200 and a generation and sending module 201.

The fourth obtaining module 200 is configured to obtain information data corresponding to identifiers of multiple positioning base stations.

In an embodiment, each positioning base station in the multiple positioning base stations has an identifier. The access device obtains information data corresponding to the identifier of each positioning base station in the multiple positioning base stations. A relationship between an access device and a positioning base station is that the information data corresponding to the identifiers of the multiple positioning base stations is delivered by the access device.

Before delivering a broadcast data stream to a terminal, the access device needs to convert original information data into the broadcast data stream. Therefore, the fourth obtaining module 200 of the access device obtains the information data corresponding to the identifier of each positioning base station in the multiple positioning base stations. A manner in which the fourth obtaining module 200 of the access device obtains the information data is not limited. Herein, two obtaining manners are used as an example for description.

In a first manner, the fourth obtaining module 200 of the access device obtains an information data stream from a location server, where the information data stream includes the information data corresponding to the identifiers of the multiple positioning base stations.

Optionally, the access device may be a mobile base station or an AP, and a specific existence form of the access device is not limited. The location server performs streaming processing on the information data corresponding to the identifier of each positioning base station, to form an information data stream. The fourth obtaining module 200 of the access device obtains the information data stream from the location server, where the information data stream includes the information data corresponding to the identifier of each positioning base station.

In a second manner, the fourth obtaining module 200 of the access device obtains, from a location server, the information data corresponding to the identifiers of the multiple positioning base stations.

Optionally, the access device may be a mobile base station or an AP, and a specific existence form of the access device is not limited. The location server serves as a source of providing the information data corresponding to the identifier of each positioning base station in at least one positioning base station. The fourth obtaining module 200 of the access device may obtain, from the location server, the information data corresponding to the identifier of each positioning base station in the multiple positioning base stations. The information data that is corresponding to the identifier of each positioning base station in the multiple positioning base stations and is obtained by the fourth obtaining module 200 of the access device from the server is static HTML document data. The information data corresponding to the identifier of each positioning base station may be preset public information data in a location area determined by each positioning base station, that is, the terminal obtains same information data when the terminal is located in a location area determined by a same positioning base station.

The generation and sending module 201 is configured to: generate a broadcast data stream according to the information data, and deliver the broadcast data stream, so that a terminal extracts, from the broadcast data stream, target information data corresponding to a target identifier of a target positioning base station.

In an embodiment, the generation and sending module 201 of the access device generates the broadcast data stream according to the obtained information data corresponding to the identifier of each positioning base station, and delivers the broadcast data stream. The terminal may extract, from the broadcast data stream, the target information data corresponding to the target identifier of the target positioning base station. It should be noted that a delivering area in which the access device delivers the broadcast data stream is a coverage area of the access device. For example, if the access device is in a store, the delivering area in which the access device delivers the broadcast data stream may be an entire store.

A manner in which the generation and sending module 201 of the access device generates the broadcast data stream according to the information data specifically needs to be determined according to a manner in which the access device obtains the information data. For example, if the information data received by the access device exists as an information data stream, the generation and sending module 201 of the access device directly determines the information data stream as the broadcast data stream, and delivers the broadcast data stream. If the information data received by the access device exists as information data, that is, streaming processing is not performed on the information data, the generation and sending module 201 of the access device needs to convert the information data to generate the broadcast data stream, and deliver the generated broadcast data stream. Herein, four manners of generating and delivering the broadcast data stream are used as an example for description.

In a first manner, the information data exists as an information data stream. The generation and sending module 201 determines the information data stream as the broadcast data stream, delivers the broadcast data stream on a preset broadcast channel, and notifies the target positioning base station of an identifier of the preset broadcast channel.

Optionally, the information data stream is information data obtained after streaming processing. Therefore, the access device may determine the information data stream as the broadcast data stream, deliver the broadcast data stream on the preset broadcast channel, and simultaneously notify all positioning base stations of the identifier of the preset broadcast channel. All the positioning base stations include the target positioning base station. When periodically broadcasting an indication message, the target positioning base station may encapsulate, into the indication message, the broadcast channel identifier of the preset broadcast channel on which the access device delivers the broadcast data stream. When receiving the indication message, the terminal may obtain the broadcast channel identifier from the indication message by means of parsing, and listen to the broadcast data stream on a frequency band corresponding to the broadcast channel identifier.

In a second manner, the information data exists as an information data stream. The generation and sending module is specifically configured to: determine the information data stream as the broadcast data stream, deliver the broadcast data stream in a preset broadcast address and a preset port, and notify the target positioning base station of the preset broadcast address and the preset port.

Optionally, the information data stream is information data obtained after streaming processing. Therefore, the access device may determine the information data stream as the broadcast data stream, deliver the broadcast data stream in the preset broadcast address and the preset port, and simultaneously notify all positioning base stations of the broadcast address and the port. All the positioning base stations include the target positioning base station. When periodically broadcasting an indication message, the target positioning base station may encapsulate, into the indication message, the broadcast address and the port for delivering the broadcast data stream by the access device. When receiving the indication message, the terminal may obtain the broadcast address and the port from the indication message by means of parsing, and listen to the broadcast data stream according to the broadcast address and the port.

In a third manner, the information data exists as static document data. The generation and sending module 201 converts, according to a preset order, the information data corresponding to the identifiers of the multiple positioning base stations into the broadcast data stream, and delivers the broadcast data stream on a preset broadcast channel.

Optionally, the access device converts, according to the preset order, the obtained information data corresponding to the identifier of each positioning base station in the at least one positioning base station into the broadcast data stream, and delivers the broadcast data stream on the preset broadcast channel. Optionally, a manner of forming the broadcast data stream may be sorting identifiers of all positioning base stations according to the preset order. For example, the sorted identifiers of all the positioning base stations are a, b, c, and d, and information data corresponding to the sorted identifiers of all the positioning base stations is sequentially delivered according to a particular time interval, to form the broadcast data stream.

The access device delivers the broadcast data stream on the preset broadcast channel, and simultaneously notifies all the positioning base stations of an identifier of the preset broadcast channel. All the positioning base stations include the target positioning base station. When periodically broadcasting an indication message, the target positioning base station may encapsulate, into the indication message, the broadcast channel identifier of the preset broadcast channel on which the access device delivers the broadcast data stream. When receiving the indication message, the terminal may obtain the broadcast channel identifier from the indication message by means of parsing, and listen to the broadcast data stream on a frequency band corresponding to the broadcast channel identifier.

In a fourth manner, the information data exists as static document data. The generation and sending module 201 converts, according to a preset order, the information data corresponding to the identifier of each positioning base station in the at least one positioning base station into the broadcast data stream, delivers the broadcast data stream in a preset broadcast address and a preset port, and notifies the target positioning base station of the preset broadcast address and the preset port.

Optionally, the access device converts, according to the preset order, the obtained information data corresponding to the identifier of each positioning base station in the at least one positioning base station into the broadcast data stream, and delivers the broadcast data stream in the preset broadcast address and the preset port. Optionally, a manner of forming the broadcast data stream may be sorting identifiers of all positioning base stations according to the preset order. For example, the sorted identifiers of all the positioning base stations are a, b, c, and d, and information data corresponding to the sorted identifiers of all the positioning base stations is sequentially delivered according to a particular time interval, to form the broadcast data stream.

The access device delivers the broadcast data stream in the preset broadcast address and the preset port, and simultaneously notifies all the positioning base stations of the broadcast address and the port. All the positioning base stations include the target positioning base station. When periodically broadcasting an indication message, the target positioning base station may encapsulate, into the indication message, the broadcast address and the port for delivering the broadcast data stream by the access device. When receiving the indication message, the terminal may obtain the broadcast address and the port from the indication message by means of parsing, and listen to the broadcast data stream according to the broadcast address and the port.

In this embodiment of the present disclosure, a terminal obtains a target identifier of a target positioning base station and a broadcast data stream that is delivered by an access device and that includes information data corresponding to an identifier of each positioning base station, and extracts, from the broadcast data stream, target information data corresponding to the target identifier. In this implementation manner, the terminal only needs to extract the corresponding target information data from the obtained broadcast data stream without a need to independently request a server, thereby reducing spectrum resources. In addition, the server does not need to independently process a request of each terminal, thereby lightening server load.

Figure 13:
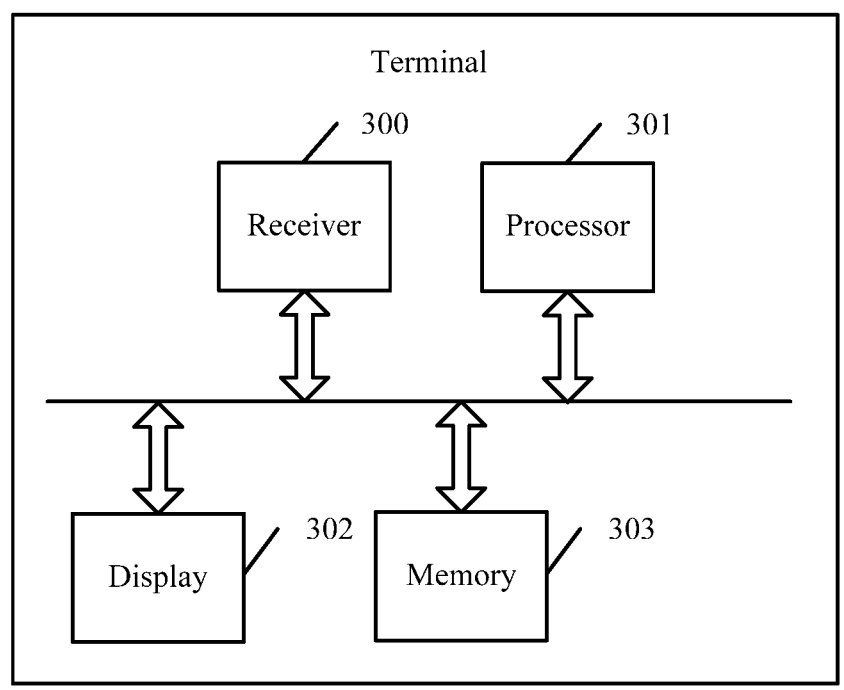
FIG. 13 is a schematic structural diagram of still another terminal according to the present disclosure.

Referring to FIG. 13, FIG. 13 is a schematic structural diagram of still another terminal according to an embodiment of the present disclosure. The terminal may include a receiver 300, a processor 301, a display 302, and a memory 303. The memory is configured to store program code, and the processor invokes the program code in the memory to complete a corresponding operation. The receiver 300, the processor 301, the display 302, and the memory 303 each are connected to a bus.

The receiver is configured to obtain a target identifier of a target positioning base station.

The receiver is further configured to obtain a broadcast data stream delivered by an access device, where the broadcast data stream includes information data corresponding to identifiers of multiple positioning base stations.

The processor is configured to extract, from the broadcast data stream, target information data corresponding to the target identifier.

Optionally, the terminal obtains the target identifier of the target positioning base station, and the target identifier may represent a location area of the target positioning base station.

Optionally, a manner in which the terminal obtains the target identifier of the target positioning base station may be: when the terminal is located in a place in which a positioning base station is deployed, the terminal performs listening on a broadcast channel, to receive one or more beacon frame signals periodically broadcasted by one or more positioning base stations in this place. Because effective coverage areas of all positioning base stations in a store overlap, the terminal may receive a beacon frame signal broadcasted by one positioning base station, or may receive beacon frame signals broadcasted by multiple positioning base stations. When receiving the beacon frame signals broadcasted by the multiple positioning base stations, the terminal needs to calculate receive power of each beacon frame signal, and determine a beacon frame signal with strongest receive power. In this case, it means that a user is closest to a corresponding positioning base station, and the positioning base station closest to the user is set as the target positioning base station. That is, a location in which the terminal is located in this case is in a location area determined by the target positioning base station.

Generally, a beacon frame signal broadcasted by a positioning base station includes an identifier of the positioning base station. Therefore, the terminal may obtain, from a beacon frame signal broadcasted by the target positioning base station, the target identifier of the target positioning base station by means of parsing.

Optionally, each positioning base station in the multiple positioning base stations has an identifier. The broadcast data stream includes information data corresponding to the identifier of each positioning base station in the multiple positioning base stations.

A relationship between a positioning base station and an access device is that information data corresponding to an identifier of the positioning base station is delivered to the terminal by the access device. The information data corresponding to the identifiers of the multiple positioning base stations may be delivered by one or more access devices, and a quantity of access devices is not limited. When the information data corresponding to the identifiers of the multiple positioning base stations is delivered by multiple access devices, each access device delivers a same broadcast data stream, and the broadcast data stream includes the information data corresponding to the identifiers of the multiple positioning base stations. When a required broadcast scope is relatively wide, the multiple access devices may be deployed.

The terminal obtains the broadcast data stream from the access device. The broadcast data stream includes the information data corresponding to the identifiers of the multiple positioning base stations. The information data corresponding to the identifier of the positioning base station is pre-stored public information data in a location area determined by the positioning base station. For example, if the location area determined by the positioning base station is an iPad product display area, the information data corresponding to the identifier of the positioning base station may be public information data related to iPad introduction.

Optionally, the terminal does not directly receive the broadcast data stream from a server. Instead, the server delivers original information data to an AP; the AP re-encapsulates the obtained information data, generates the broadcast data stream, and broadcasts the broadcast data stream on a frequency band corresponding to a broadcast channel identifier of the AP; and the terminal listens to, on the frequency band corresponding to the broadcast channel identifier of the AP, the broadcast data stream broadcasted by the AP. In addition, alternatively, the server may perform streaming processing on information data to form an information data stream, where the information data stream includes the information data corresponding to the identifier of each positioning base station; and then send the information data stream to a mobile base station. The mobile base station determines the information data stream as the broadcast data stream, and delivers the broadcast data stream according to a preset broadcast address and a preset port. The terminal listens to the broadcast data stream according to the corresponding broadcast address and the corresponding port.

Optionally, the broadcast data stream includes information data corresponding to identifiers of all positioning base stations. Therefore, the terminal may extract, from the broadcast data stream, the target information data corresponding to the target identifier. The target information data is public information data corresponding to the location area determined by the target positioning base station.

Optionally, when receiving the broadcast data stream, the terminal sequentially detects the information data in the received broadcast data stream, and detects whether the identifier of each positioning base station in the broadcast data stream is consistent with the target identifier. If the identifier of each positioning base station is consistent with the target identifier, the terminal extracts the target information data corresponding to the target identifier; or if the identifier of each positioning base station is not consistent with the target identifier, the terminal discards the received information data.

The receiver is further configured to determine the target positioning base station.

The receiver is further configured to obtain an indication message broadcasted by the target positioning base station, where the indication message includes the target identifier of the target positioning base station.

The processor is further configured to obtain the target identifier from the indication message by means of parsing.

Optionally, when the terminal is located in a place in which a positioning base station is deployed, the terminal receives an indication message broadcasted by the positioning base station. When the terminal is located in an effective coverage area of a positioning base station, the terminal receives an indication message broadcasted by the positioning base station, and determines the positioning base station as the target positioning base station. Because effective coverage areas of all positioning base stations may overlap, when the terminal is located in an overlapping area of effective coverage areas of multiple positioning base stations, the terminal receives at least one indication message. In this case, the terminal compares receive power of all indication messages, and determines a positioning base station corresponding to an indication message with strongest receive power as the target positioning base station, that is, the terminal determines a positioning base station closest to the terminal as the target positioning base station.

A method for obtaining the target identifier of the target positioning base station by the terminal may be: the terminal obtains the indication message broadcasted by the target positioning base station, where the indication message includes the target identifier of the target positioning base station.

Herein, an example in which the indication message is a beacon frame is used for description. The positioning base station is a wireless signal transmitter placed in a specific indoor location. The positioning base station periodically broadcasts a beacon frame in a wireless signal form such as Wi-Fi or Bluetooth. Because of a requirement for power consumption, most positioning base stations broadcast beacon frames in a Bluetooth manner. According to Bluetooth specifications, frequency bands (2402 MHz, 2426 MHz, and 2480 MHz) of three broadcast channels are defined. In this case, the positioning base station periodically broadcasts a beacon frame on the foregoing three broadcast channels in turn. The broadcasted beacon frame carries an identifier (ID) of the positioning base station, and the identifier may be used to represent optional location coordinates of the positioning base station. In addition, the beacon frame further carries other information. For example, information carried in the beacon frame is extended in the present disclosure, and the beacon frame includes a broadcast channel identifier of a wireless access point AP, and the like. After determining the target positioning base station, the terminal obtains a beacon frame broadcasted by the target positioning base station.

Optionally, the terminal obtains the target identifier from the received indication message by means of parsing. Optionally, the terminal may obtain, from a beacon frame by means of parsing, a target identifier carried in the beacon frame.

The indication message further includes a broadcast channel identifier for sending the broadcast data stream by the access device.

The receiver is further configured to: listen to a frequency band corresponding to the broadcast channel identifier, and obtain the broadcast data stream broadcasted by the access device.

Optionally, the access device may be an AP, and herein, the access device is used as an example for description. The indication message may further include a broadcast channel identifier for delivering the broadcast data stream by the AP. The terminal obtains the broadcast channel identifier from the indication message, and listens to a frequency band corresponding to the broadcast channel identifier. The AP delivers the broadcast data stream on a broadcast channel represented by the broadcast channel identifier. Therefore, the terminal may obtain the broadcast data stream broadcasted by the AP. The broadcast data stream includes the information data corresponding to the identifier of each positioning base station.

The indication message further includes a broadcast address and a port that are of the access device.

The receiver is further configured to listen to, according to the broadcast address and the port, the broadcast data stream broadcasted by the access device.

Optionally, the access device may be a mobile base station, and herein, the mobile base station is used as an example for description. The broadcast data stream is broadcasted by the mobile base station. Therefore, the indication message broadcasted by the target positioning base station includes a broadcast address and a port for delivering the broadcast data stream by the mobile base station. The terminal obtains, by means of parsing, the broadcast address and the port from the indication message broadcasted by the target positioning base station, and listens to, according to the broadcast address and the port, the broadcast data stream broadcasted by the mobile base station. It should be noted that the indication message may be a beacon frame, and content in the beacon frame may be extended.

The terminal obtains the broadcast data stream by using the mobile base station, that is, the terminal is connected to the mobile base station by turning on a cellular mobile wireless communication system such as 3G/4G/LTE, so as to access the Internet.

The target information data includes first target information data and at least one piece of second target information data, and the first target information data includes at least one label.

The processor is further configured to generate a first service page according to the first target information data, where the first service page includes the at least one label.

The display is configured to display the first service page.

The processor is further configured to: when detecting that an operation is performed on a target label in a label displayed on the first service page, obtain second target information data corresponding to the target label.

The display is further configured to: generate a second service page according to the second target information data corresponding to the target label, and display the second service page.

Optionally, the target information data includes the first target information data and the at least one piece of second target information data, and the first target information data includes the at least one label. The at least one piece of second target information data may be in a one-to-one correspondence with the at least one label, or one label may be corresponding to multiple pieces of second target information data. The correspondence may be an association relationship between second target information data and a label. For example, the label may be a link of the second target information data, and the second target information data corresponding to the label may be obtained by using the label.

The terminal generates the first service page according to the first target information data in the target information data, where the first service page includes the at least one label. Herein, an example in which the first service page is an LBS service page is used for description. The LBS service page is a document edited by using a Hypertext Markup Language (HTML). The document includes several labels, and may be opened in a browser and another application program and displayed as a Web page. Generally, one positioning base station is corresponding to one LBS service page. Therefore, the first service page is a service page corresponding to the target positioning base station. For example, if the location area of the target positioning base station is an iPhone product display area, the first service page is iPhone series product introduction, and the first service page includes three labels: iPhone 5s, iPhone 5c, and iPhone 4s.

Optionally, the terminal may display the first service page, and enable a user to perform an operation on the service page. For example, if the first service page is a Hypertext Markup Language document, the terminal may open the first service page in a browser and another application program, and display the first service page as a Web page.

Optionally, the user may perform an operation on the label displayed on the first service page. When detecting that an operation is performed on the target label in the displayed label, the terminal obtains the second target information data corresponding to the target label.

Optionally, herein, a label in an LBS service page is used as an example for description. When the terminal displays the first service page, the user may obtain, by clicking an icon or another object on the page, an LBS service page corresponding to the target label. For example, when the terminal of the user displays the first service page of the iPhone series product introduction, the three labels including the iPhone 5s, the iPhone 5c, and the iPhone 4s are displayed on this page. When the user wants to read specific product introduction of the iPhone 5s, the user may click a label of the iPhone 5s on the terminal. In this case, the iPhone 5s is the target label. The terminal obtains, from the target information data, second target information data corresponding to the iPhone 5s.

Optionally, the terminal generates the second service page according to the second target information data corresponding to the target label, and displays the second service page.

Optionally, the terminal finds, according to the target label, second target information data that is corresponding to the target label and is related to iPhone 5s product performance introduction, generates an LBS service page, and displays the LBS service page on the terminal.

The receiver is further configured to obtain, in a first preset period, the broadcast data stream delivered by the access device, where the broadcast data stream is delivered by the access device in a second preset period, and the first preset period is a positive integer multiple of the second preset period.

Optionally, the access device generally broadcasts the broadcast data stream in a particular period. For example, the access device delivers the broadcast data stream in the second preset period, and the second preset period may be 1 s, that is, the delivered broadcast data stream is repeatedly delivered every 1 s. Within the 1 s, the broadcast data stream includes information data corresponding to all positioning base stations in the at least one positioning base station. Because the information data may be updated at any time, broadcast data streams delivered in every period may be different. To obtain updated content in a timely manner by the terminal, the terminal obtains, in the first preset period, the broadcast data stream delivered by the access device, and the first preset period is an integer multiple of the second preset period. For example, the first preset period may be 3 s. The terminal automatically discards same information data received in the first preset period. The updated content may be obtained in a timely manner when the terminal obtains the broadcast data stream in the first preset period.

In this embodiment of the present disclosure, a terminal obtains a target identifier of a target positioning base station and a broadcast data stream that is delivered by an access device and that includes information data corresponding to an identifier of each positioning base station, and extracts, from the broadcast data stream, target information data corresponding to the target identifier. In this implementation manner, the terminal only needs to extract the corresponding target information data from the obtained broadcast data stream without a need to independently request a server, thereby reducing spectrum resources. In addition, the server does not need to independently process a request of each terminal, thereby lightening server load.

Figure 14:
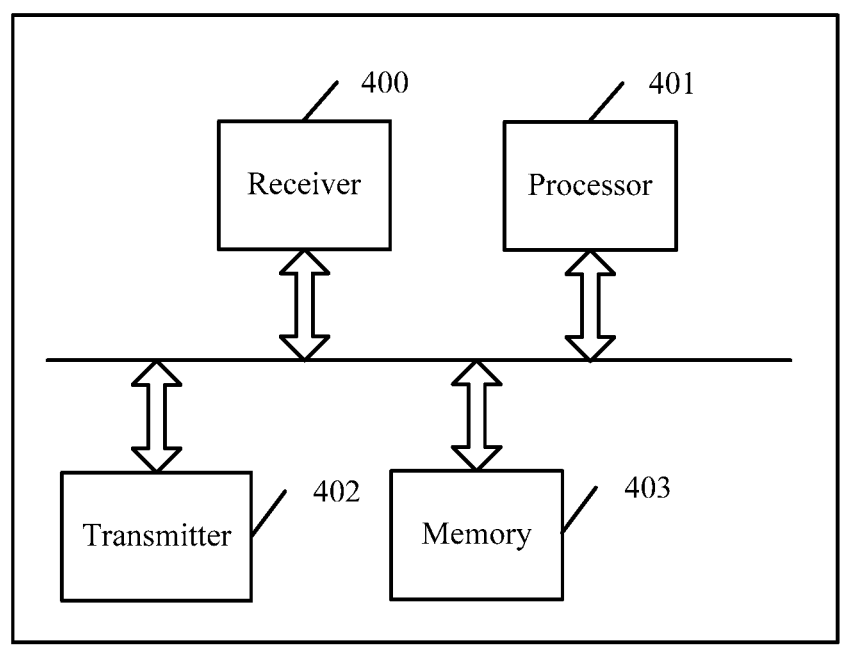
FIG. 14 is a schematic structural diagram of another access device according to the present disclosure.

Referring to FIG. 14, FIG. 14 is a schematic structural diagram of another access device according to an embodiment of the present disclosure. The access device may include a receiver 400, a processor 401, a transmitter 402, and a memory 403. The memory is configured to store program code, and the processor invokes the program code in the memory to complete a corresponding operation. The receiver 400, the processor 401, the transmitter 402, and the memory 403 each communicate with a bus.

The receiver is configured to obtain information data corresponding to identifiers of multiple positioning base stations.

The processor is configured to generate a broadcast data stream according to the information data.

The transmitter is configured to deliver the broadcast data stream, so that a terminal extracts, from the broadcast data stream, target information data corresponding to a target identifier of a target positioning base station.

Optionally, each positioning base station in the multiple positioning base stations has an identifier. The access device obtains information data corresponding to the identifier of each positioning base station in the multiple positioning base stations. A relationship between an access device and a positioning base station is that the information data corresponding to the identifiers of the multiple positioning base stations is delivered by the access device.

Before delivering the broadcast data stream to the terminal, the access device needs to convert original information data into the broadcast data stream. Therefore, the access device obtains the information data corresponding to the identifier of each positioning base station in the multiple positioning base stations. A manner in which the access device obtains the information data is not limited. Herein, two obtaining manners are used as an example for description.

In a first manner, a manner in which the access device obtains the information data corresponding to the identifier of each positioning base station may be: a server performs streaming processing on the information data corresponding to the identifier of each positioning base station, to form an information data stream. The access device obtains the information data stream from a location server, where the information data stream includes the information data corresponding to the identifier of each positioning base station.

In a second manner, a manner in which the access device obtains the information data corresponding to the identifier of each positioning base station may be: the access device directly obtains, from a server, the information data, corresponding to the identifier of each positioning base station, on which streaming processing is not performed.

The information data may be static HTML document data. The information data corresponding to the identifier of each positioning base station may be preset public information data in a location area determined by each positioning base station, that is, the terminal obtains same information data when the terminal is located in a location area determined by a same positioning base station.

Optionally, the access device generates the broadcast data stream according to the obtained information data corresponding to the identifier of each positioning base station, and delivers the broadcast data stream. The terminal may extract, from the broadcast data stream, the target information data corresponding to the target identifier of the target positioning base station.

A manner in which the access device generates the broadcast data stream according to the information data specifically needs to be determined according to a manner in which the access device obtains the information data. For example, if the information data received by the access device exists as an information data stream, the access device directly determines the information data stream as the broadcast data stream, and delivers the broadcast data stream. If the information data received by the access device exists as information data, that is, streaming processing is not performed on the information data, the access device needs to convert the information data to generate the broadcast data stream.

The receiver is further configured to obtain an information data stream from a location server, where the information data stream includes the information data corresponding to the identifiers of the multiple positioning base stations.

Optionally, the access device may be a mobile base station or an AP, and a specific existence form of the access device is not limited. The location server performs streaming processing on the information data corresponding to the identifier of each positioning base station, to form an information data stream. The access device obtains the information data stream from the location server, where the information data stream includes the information data corresponding to the identifier of each positioning base station.

After obtaining the information data stream from the location server, the access device generates the broadcast data stream according to the obtained information data stream, and delivers the broadcast data stream.

The transmitter is further configured to: determine the information data stream as the broadcast data stream, deliver the broadcast data stream on a preset broadcast channel, and notify the target positioning base station of an identifier of the preset broadcast channel;

or the transmitter is further configured to: determine the information data stream as the broadcast data stream, deliver the broadcast data stream in a preset broadcast address and a preset port, and notify the target positioning base station of the preset broadcast address and the preset port.

Optionally, the information data stream is information data obtained after streaming processing. Therefore, the access device may determine the information data stream as the broadcast data stream, deliver the broadcast data stream on the preset broadcast channel, and simultaneously notify all positioning base stations of the identifier of the preset broadcast channel. All the positioning base stations include the target positioning base station. When periodically broadcasting an indication message, the target positioning base station may encapsulate, into the indication message, the broadcast channel identifier of the preset broadcast channel on which the access device delivers the broadcast data stream. When receiving the indication message, the terminal may obtain the broadcast channel identifier from the indication message by means of parsing, and listen to the broadcast data stream on a frequency band corresponding to the broadcast channel identifier.

Optionally, the information data stream is information data obtained after streaming processing. Therefore, the access device may determine the information data stream as the broadcast data stream, deliver the broadcast data stream in the preset broadcast address and the preset port, and simultaneously notify all positioning base stations of the broadcast address and the port. All the positioning base stations include the target positioning base station. When periodically broadcasting an indication message, the target positioning base station may encapsulate, into the indication message, the broadcast address and the port for delivering the broadcast data stream by the access device. When receiving the indication message, the terminal may obtain the broadcast address and the port from the indication message by means of parsing, and listen to the broadcast data stream according to the broadcast address and the port.

The receiver is further configured to obtain, from a location server, the information data corresponding to the identifiers of the multiple positioning base stations.

The processor is further configured to convert, according to a preset order, the information data corresponding to the identifiers of the multiple positioning base stations into the broadcast data stream, and the transmitter is configured to: deliver the broadcast data stream on a preset broadcast channel, and notify the target positioning base station of an identifier of the preset broadcast channel; or the processor is further configured to convert, according to a preset order, the information data corresponding to the identifier of each positioning base station in the at least one positioning base station into the broadcast data stream, and the transmitter is configured to: deliver the broadcast data stream in a preset broadcast address and a preset port, and notify the target positioning base station of the preset broadcast address and the preset port.

Optionally, the access device may be a mobile base station or an AP, and a specific existence form of the access device is not limited. The location server serves as a source of providing the information data corresponding to the identifier of each positioning base station in the at least one positioning base station. The access device may obtain, from the location server, the information data corresponding to the identifier of each positioning base station in the multiple positioning base stations. The information data that is corresponding to the identifier of each positioning base station in the multiple positioning base stations and is obtained by the access device from the server is static document data.

Because streaming processing is not performed on the obtained information data, the access device needs to perform streaming processing on the information data to form the broadcast data stream.

Optionally, the access device converts, according to the preset order, the obtained information data corresponding to the identifier of each positioning base station in the at least one positioning base station into the broadcast data stream, and delivers the broadcast data stream on the preset broadcast channel. Optionally, a manner of forming the broadcast data stream may be sorting identifiers of all positioning base stations according to the preset order. For example, the sorted identifiers of all the positioning base stations are a, b, c, and d, and information data corresponding to the sorted identifiers of all the positioning base stations is sequentially delivered according to a particular time interval, to form the broadcast data stream.

The access device delivers the broadcast data stream on the preset broadcast channel, and simultaneously notifies all the positioning base stations of the identifier of the preset broadcast channel. All the positioning base stations include the target positioning base station. When periodically broadcasting an indication message, the target positioning base station may encapsulate, into the indication message, the broadcast channel identifier of the preset broadcast channel on which the access device delivers the broadcast data stream. When receiving the indication message, the terminal may obtain the broadcast channel identifier from the indication message by means of parsing, and listen to the broadcast data stream on a frequency band corresponding to the broadcast channel identifier.

Optionally, the access device converts, according to the preset order, the obtained information data corresponding to the identifier of each positioning base station in the at least one positioning base station into the broadcast data stream, and delivers the broadcast data stream in the preset broadcast address and the preset port. Optionally, a manner of forming the broadcast data stream may be sorting identifiers of all positioning base stations according to the preset order. For example, the sorted identifiers of all the positioning base stations are a, b, c, and d, and information data corresponding to the sorted identifiers of all the positioning base stations is sequentially delivered according to a particular time interval, to form the broadcast data stream.

The access device delivers the broadcast data stream in the preset broadcast address and the preset port, and simultaneously notifies all the positioning base stations of the broadcast address and the port. All the positioning base stations include the target positioning base station. When periodically broadcasting an indication message, the target positioning base station may encapsulate, into the indication message, the broadcast address and the port for delivering the broadcast data stream by the access device. When receiving the indication message, the terminal may obtain the broadcast address and the port from the indication message by means of parsing, and listen to the broadcast data stream according to the broadcast address and the port.

In this embodiment of the present disclosure, a terminal obtains a target identifier of a target positioning base station and a broadcast data stream that is delivered by an access device and that includes information data corresponding to an identifier of each positioning base station, and extracts, from the broadcast data stream, target information data corresponding to the target identifier. In this implementation manner, the terminal only needs to extract the corresponding target information data from the obtained broadcast data stream without a need to independently request a server, thereby reducing spectrum resources. In addition, the server does not need to independently process a request of each terminal, thereby lightening server load.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may be: a magnetic disk, an optical disc, a read-only memory (ROM), or a random access memory (RAM).

What is disclosed above is merely exemplary embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A data pushing method, comprising:
    obtaining, by a terminal, a target identifier of a target positioning base station;
    obtaining, by the terminal, a broadcast data stream delivered by an access device, wherein the broadcast data stream comprises information data corresponding to multiple identifiers of multiple positioning base stations; and
    extracting, by the terminal from the broadcast data stream, target information data corresponding to the target identifier of the target positioning base station.

2. The method according to claim 1, wherein the obtaining, by the terminal, the target identifier of the target positioning base station comprises:
    determining, by the terminal, the target positioning base station;
    obtaining, by the terminal, an indication message broadcasted by the target positioning base station, wherein the indication message comprises the target identifier; and parsing, by the terminal, the indication message to obtain the target identifier.

3. The method according to claim 2, wherein the indication message further comprises a broadcast channel identifier for sending the broadcast data stream by the access device; and the obtaining, by the terminal, the broadcast data stream delivered by the access device comprises:
performing, by the terminal, listening on a frequency band corresponding to the broadcast channel identifier, and
receiving the broadcast data stream broadcasted by the access device.

4. The method according to claim 2, wherein the indication message further comprises a broadcast address and a port that are of the access device; and the obtaining, by the terminal, the broadcast data stream delivered by the access device comprises:
listening to, by the terminal according to the broadcast address and the port, the broadcast data stream broadcasted by the access device.

5. The method according to claim 1, wherein the target information data comprises first target information data and at least one piece of second target information data, and the first target information data comprises at least one label; and after the extracting, by the terminal from the broadcast data stream, the target information data corresponding to the target identifier, the method further comprises:
generating, by the terminal, a first service page according to the first target information data, wherein the first service page comprises the at least one label;
displaying, by the terminal, the first service page;
in response to detecting that an operation is performed on a target label in a label displayed on the first service page, obtaining, by the terminal, second target information data corresponding to the target label; and
generating, by the terminal, a second service page according to the second target information data corresponding to the target label, and displaying the second service page.

6. The method according to claim 1, wherein the obtaining, by the terminal, the broadcast data stream delivered by the access device comprises:
obtaining, by the terminal in a first preset period, the broadcast data stream delivered by the access device, wherein the broadcast data stream is delivered by the access device in a second preset period, and the first preset period is a positive integer multiple of the second preset period.

7. A data pushing method, comprising:
obtaining, by an access device, information data corresponding to multiple identifiers of multiple positioning base stations; and
generating, by the access device, a broadcast data stream according to the information data, and delivering, by the access device, the broadcast data stream to a terminal device, so that the terminal extracts, from the broadcast data stream, target information data corresponding to a target identifier of a target positioning base station.

8. The method according to claim 7, wherein the obtaining, by the access device, the information data corresponding to the multiple identifiers of multiple positioning base stations comprises:
obtaining, by the access device, an information data stream from a location server, wherein the information data stream comprises the information data corresponding to the multiple identifiers of the multiple positioning base stations.

9. The method according to claim 8, wherein the generating, by the access device, the broadcast data stream according to the information data, and delivering the broadcast data stream comprises:
determining, by the access device, the information data stream as the broadcast data stream, delivering the broadcast data stream on a preset broadcast channel, and notifying the target positioning base station of an identifier of the preset broadcast channel; or
determining, by the access device, the information data stream as the broadcast data stream, delivering the broadcast data stream according to a preset broadcast address and a preset port, and notifying the target positioning base station of the preset broadcast address and the preset port.

10. The method according to claim 7, wherein the obtaining, by the access device, the information data corresponding to the multiple identifiers of multiple positioning base stations comprises:
obtaining, by the access device from a location server, the information data corresponding to the multiple identifiers of the multiple positioning base stations; and
wherein generating, by the access device, the broadcast data stream according to the information data, and delivering the broadcast data stream comprises:
converting, by the access device according to a preset order, the information data corresponding to the multiple identifiers of the multiple positioning base stations into the broadcast data stream, delivering the broadcast data stream on a preset broadcast channel, and notifying the target positioning base station of an identifier of the preset broadcast channel; or
converting, by the access device according to a preset order, the information data corresponding to the multiple identifiers of the multiple positioning base stations into the broadcast data stream, delivering the broadcast data stream in a preset broadcast address and a preset port, and notifying the target positioning base station of the preset broadcast address and the preset port.

11. A terminal, comprising:
a processor; and
a receiver configured to:
obtain a target identifier of a target positioning base station; and
obtain a broadcast data stream delivered by an access device, wherein the broadcast data stream comprises information data corresponding to multiple identifiers of multiple positioning base stations; and
wherein the processor is configured to extract, from the broadcast data stream, target information data corresponding to the target identifier.

12. The terminal according to claim 11,
wherein the receiver is further configured to:
determine the target positioning base station; and
obtain an indication message broadcasted by the target positioning base station, wherein the indication message comprises the target identifier of the target positioning base station; and
wherein the processor is further configured to parse the indication message to obtain the target identifier.

13. The terminal according to claim 12, wherein
the indication message further comprises a broadcast channel identifier for sending the broadcast data stream by the access device; and
the receiver is further configured to: listen to a frequency band corresponding to the broadcast channel identifier, and obtain the broadcast data stream broadcasted by the access device.

14. The terminal according to claim 12, wherein
the indication message further comprises a broadcast address and a port that are of the access device; and
the receiver is further configured to listen to, according to the broadcast address and the port, the broadcast data stream broadcasted by the access device.

15. The terminal according to claim 11, wherein
the terminal further comprises a display;
the target information data comprises first target information data and at least one piece of second target information data, and the first target information data comprises at least one label;
the processor is further configured to generate a first service page according to the first target information data, wherein the first service page comprises the at least one label;
the display is configured to display the first service page;
the processor is further configured to: in response to detecting that an operation is performed on a target label in a label displayed on the first service page, obtain second target information data corresponding to the target label; and
the display is further configured to: generate a second service page according to the second target information data corresponding to the target label, and display the second service page.

16. The terminal according to claim 11, wherein the receiver is further configured to obtain, in a first preset period, the broadcast data stream delivered by the access device, wherein the broadcast data stream is delivered by the access device in a second preset period, and the first preset period is a positive integer multiple of the second preset period.

17. An access device, comprising:
a receiver,
a processor, and
a transmitter,
wherein the receiver is configured to obtain information data corresponding to multiple identifiers of multiple positioning base stations;
wherein the processor is configured to generate a broadcast data stream according to the information data; and
wherein the transmitter is configured to deliver the broadcast data stream to a terminal, so that the terminal extracts, from the broadcast data stream, target information data corresponding to a target identifier of a target positioning base station.

18. The access device according to claim 17, wherein the receiver is further configured to obtain an information data stream from a location server, wherein the information data stream comprises the information data corresponding to the identifiers of the multiple positioning base stations.

19. The access device according to claim 18, wherein
the transmitter is further configured to: determine the information data stream as the broadcast data stream, deliver the broadcast data stream on a preset broadcast channel, and notify the target positioning base station of an identifier of the preset broadcast channel; or
the transmitter is further configured to: determine the information data stream as the broadcast data stream, deliver the broadcast data stream in a preset broadcast address and a preset port, and notify the target positioning base station of the preset broadcast address and the preset port.

20. The access device according to claim 17,
wherein the receiver is further configured to obtain, from a location server, the information data corresponding to the identifiers of the multiple positioning base stations; and
wherein the processor is further configured to:
convert, according to a preset order, the information data corresponding to the multiple identifiers of the multiple positioning base stations into the broadcast data stream, and the transmitter is configured to: deliver the broadcast data stream on a preset broadcast channel, and notify the target positioning base station of an identifier of the preset broadcast channel; or
convert, according to a preset order, the information data corresponding to the multiple identifiers of the multiple positioning base stations into the broadcast data stream, and the transmitter is configured to: deliver the broadcast data stream in a preset broadcast address and a preset port, and notify the target positioning base station of the preset broadcast address and the preset port.

* * * * *